United States Patent
Nakashima et al.

(10) Patent No.: US 9,288,789 B2
(45) Date of Patent: Mar. 15, 2016

(54) MOBILE STATION DEVICE, COMMUNICATION SYSTEM, COMMUNICATION METHOD, INTEGRATED CIRCUIT, AND CIRCUIT DEVICE

(75) Inventors: Daiichiro Nakashima, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 84 days.

(21) Appl. No.: 13/809,566

(22) PCT Filed: Jul. 29, 2011

(86) PCT No.: PCT/JP2011/067441
§ 371 (c)(1),
(2), (4) Date: Jan. 10, 2013

(87) PCT Pub. No.: WO2012/017941
PCT Pub. Date: Feb. 9, 2012

(65) Prior Publication Data
US 2013/0128854 A1    May 23, 2013

(30) Foreign Application Priority Data

Aug. 4, 2010   (JP) ................................. 2010-175220

(51) Int. Cl.
*H04W 4/00*     (2009.01)
*H04W 72/04*    (2009.01)
(Continued)

(52) U.S. Cl.
CPC ............. *H04W 72/04* (2013.01); *H04L 1/0047* (2013.01); *H04L 1/1861* (2013.01); *H04L 5/005* (2013.01);
(Continued)

(58) Field of Classification Search
CPC ... H04L 5/0053; H04L 5/0007; H04L 5/0055; H04L 5/001; H04L 5/0058; H04L 1/1861; H04W 52/146; H04W 52/34; H04W 72/0413; H04W 74/006; H04W 52/221; H04W 52/246; H04W 52/365; H04W 72/04; H04W 72/1284; H04W 72/1278

USPC ......................................................... 370/329
See application file for complete search history.

(56) References Cited

U.S. PATENT DOCUMENTS

| 2010/0091724 A1* | 4/2010 | Ishii et al. ..................... 370/329 |
| 2010/0246463 A1* | 9/2010 | Papasakellariou et al. ... 370/311 |

(Continued)

FOREIGN PATENT DOCUMENTS

| WO | 2010/032773 A1 | 3/2010 |
| WO | 2010/074504 A2 | 7/2010 |

OTHER PUBLICATIONS

LG Electronics, "UCI multiplexing for LTE-A", 3GPP TSG RAN WG1 #61bis, R1-103729, Dresden, Germany, Jun. 28-Jul. 2, 2010, pp. 1-4.

(Continued)

*Primary Examiner* — Alpus H Hsu
*Assistant Examiner* — Elton Williams
(74) *Attorney, Agent, or Firm* — Birch, Stewart, Kolasch & Birch, LLP

(57) ABSTRACT

A mobile station device includes: a management unit managing generation of uplink control information; a transmission power parameter setting unit setting a value of a parameter relevant to transmission power in accordance with the number of information bits of receipt acknowledgement and scheduling request, when the management unit generates the receipt acknowledgement which is uplink control information indicating positive or negative acknowledgement for downlink data and the scheduling request which is uplink control information indicating whether to request resource allocation; and a transmission processing unit controlling, by means of the parameter value set by the transmission power parameter setting unit, the transmission power for a physical uplink control channel used for transmitting a signal generated from the information bits of the receipt acknowledgement and the scheduling request, and transmitting the signal to a base station device using the physical uplink control channel with the controlled transmission power.

6 Claims, 11 Drawing Sheets

(51) Int. Cl.

| | |
|---|---|
| *H04W 52/14* | (2009.01) |
| *H04W 52/24* | (2009.01) |
| *H04W 52/32* | (2009.01) |
| *H04W 52/48* | (2009.01) |
| *H04L 1/18* | (2006.01) |
| *H04L 1/16* | (2006.01) |
| *H04L 1/00* | (2006.01) |
| *H04L 5/00* | (2006.01) |
| *H04W 52/34* | (2009.01) |
| *H04W 72/12* | (2009.01) |
| *H04L 27/26* | (2006.01) |

(52) U.S. Cl.
CPC ............ *H04L 5/0048* (2013.01); *H04L 5/0053* (2013.01); *H04W 52/146* (2013.01); *H04W 52/246* (2013.01); *H04W 52/325* (2013.01); *H04W 52/48* (2013.01); *H04L 1/007* (2013.01); *H04L 1/0031* (2013.01); *H04L 1/1671* (2013.01); *H04L 1/1692* (2013.01); *H04L 5/001* (2013.01); *H04L 27/2601* (2013.01); *H04W 52/34* (2013.01); *H04W 72/1284* (2013.01)

(56) References Cited

U.S. PATENT DOCUMENTS

| | | | | |
|---|---|---|---|---|
| 2011/0126071 | A1* | 5/2011 | Han et al. ................... 714/749 |
| 2011/0243066 | A1* | 10/2011 | Nayeb Nazar et al. ....... 370/328 |
| 2011/0243087 | A1* | 10/2011 | Ahn et al. ................... 370/329 |
| 2011/0281612 | A1 | 11/2011 | Ishii et al. |
| 2013/0259011 | A1* | 10/2013 | Nakashima et al. .......... 370/336 |

OTHER PUBLICATIONS

Samsung, "Concurrent transmission of Scheduling Request indicator and ACK/NACK information for LTE-Advanced", 3GPP TSG RAN WG1 #61, R1-103004, Montreal, Canada, May 10-14, 2010, pp. 1-7.

Samsung, "Power Scalling for UL TPC with Carreir Aggregation", 3GPP TSG RAN WG1 #60, R1-101148, San Francisco, USA, Feb. 22-26, 2010, pp. 1-4.

Ericsson, ST-Ericsson, "Evaluation of PUCCH Proposals for Carrier Aggregation", 3GPP TSG-RAN WG1 #60bis, Beijing, China, Apr. 12-16, 2010, R1-101731, pp. 1-9.

Motorola, "ACK/NACK and SR Multiplexing in PUCCH," 3GPP TSG RAN1#51-Bis, R1-080085, Sevilla, Spain, Jan. 14-18, 2008 (retrieved Jan. 8, 2008), 2 pgs.

Texas Instruments, "Simultaneous ACK/NAK and SR Transmission in Uplink," 3GPP TSG RAN WG1 #51bis, R1-080193, Sevilla, Spain, Jan. 14-18, 2008 (retrieved on Jan. 9, 2008), pp. 1-6.

* cited by examiner

FIG.7

| NUMBER OF INFORMATION BITS OF ACK/NACK AND SR | VALUE OF PARAMETER RELEVANT TO TRANSMISSION POWER [dB] |
|---|---|
| N1 | X1 |
| N2 | X2 |
| N3 | X3 |
| N4 | X4 |
| N5 | X5 |
| N6 | X6 |
| N7 | X7 |
| N8 | X8 |
| N9 | X9 |
| N10 | X10 |

MOBILE STATION DEVICE, COMMUNICATION SYSTEM, COMMUNICATION METHOD, INTEGRATED CIRCUIT, AND CIRCUIT DEVICE

TECHNICAL FIELD

The present invention relates to a mobile station device, a communication system, a communication method, an integrated circuit, and a circuit device. In particular, the invention relates to a mobile station device communicating with a base station, a communication system including a base station device and a mobile station device, a communication method for use in a mobile station device, and an integrated circuit and a circuit device mounted on a mobile station device to cause the mobile station device to perform multiple functions.

BACKGROUND ART

Evolution of the radio access scheme and the radio network for cellular mobile communication (LTE (Long Term Evolution) or EUTRA (Evolved Universal Terrestrial Radio Access)) has been specified by the 3rd Generation Partnership Project (3GPP). LTE uses, as a communication scheme for downlink radio communication (also referred to as "DL") from a base station device to a mobile station device, the Orthogonal Frequency Division Multiplexing (OFDM) scheme which is a multicarrier transmission scheme. LTE also uses, as a communication scheme for uplink radio communication (also referred to as "UL") from a mobile station device to the base station device, the SC-FDMA (Single-Carrier Frequency Division Multiple Access) scheme which is a single-carrier transmission scheme. LTE uses the DFT-Spread OFDM (Discrete Fourier Transform-Spread OFDM) scheme as the SC-FDMA scheme.

The 3GPP has studied a radio access scheme and a radio network that use a broader frequency band than LTE to implement still faster data communication (LTE-A (Long Term Evolution-Advanced) or A-EUTRA (Advanced Evolved Universal Terrestrial Radio Access)). LTE-A is required to have backward compatibility with LTE. Specifically, LTE-A is required to meet the requirement that a base station device conforming to LTE-A should communicate with both a mobile station device conforming to LTE-A and a mobile station device conforming to LTE simultaneously, and the requirement that a mobile station device conforming to LTE-A should communicate with the base station device conforming to LTE-A and a base station device conforming to LTE. In order to meet these requirements, it has been studied for LTE-A to at least support the same channel structure as that of LTE. "Channel" means a medium used for signal transmission. There are different types of channels including, for example, Physical Downlink Shared CHannel (PDSCH) used for transmitting/receiving downlink data, Physical Downlink Control CHannel (PDCCH) used for transmitting/receiving downlink control information, Physical Uplink Shared CHannel (PUSCH) used for transmitting/receiving uplink data and uplink control information, Physical Uplink Control CHannel (PUCCH) used for transmitting/receiving uplink control information, Synchronization CHannel (SCH) used for establishing downlink synchronization, Physical Random Access CHannel (PRACH) used for establishing uplink synchronization, and Physical Broadcast CHannel (PBCH) used for transmitting downlink system information.

Regarding LTE-A, a technology of using multiple frequency bands (component carriers (CC)) of the same channel structure as that of LTE, as one frequency band (wider frequency band). This technology is also referred to, for example, as spectrum aggregation, carrier aggregation, or frequency aggregation.

Specifically, in the communication using this technology, each component carrier of downlink (hereinafter referred to as "downlink component carrier") transmits/receives a downlink channel, and each component carrier of uplink (hereinafter referred to as uplink component carrier) transmits/receives an uplink channel. Namely, carrier aggregation is a technology allowing a base station device and a mobile station device to simultaneously transmit/receive signals on multiple channels, using multiple component carriers for uplink and downlink. Here, "downlink component carrier" is also referred to as "DL CC" and "uplink component carrier" is also referred to as "UL CC."

A mobile station device uses the physical uplink control channel to transmit control information (receipt acknowledgement: ACK/NACK) indicating acknowledgement (ACK) or negative acknowledgement (NACK)) in response to data received using the physical downlink shared channel. The base station device controls retransmission of the physical downlink shared channel based on the receipt acknowledgement received from the mobile station device. According to LTE-A using the carrier aggregation, the base station device can simultaneously use multiple physical downlink shared channels to transmit data to a mobile station device. The mobile station device receiving multiple physical downlink shared channels by means of the carrier aggregation must inform the base station device of multiple receipt acknowledgements simultaneously. As for LTE, the base station device can simultaneously use only one physical downlink shared channel to transmit data to a mobile station device. The mobile station device receiving one physical downlink shared channel uses the physical uplink control channel to inform the base station device of one receipt acknowledgement. Regarding LTE-A, it has been studied to introduce a physical uplink control channel of a new signal configuration for allowing a mobile station device to transmit multiple receipt acknowledgements to the base station device. Specifically, it has been studied to introduce a physical uplink control channel using the DFT-S-OFDM scheme.

In LTE-A, it has been studied to allow a mobile station device to transmit, using the physical uplink control channel, control information (scheduling request: SR) indicating a request for uplink resource allocation, like LTE. As also disclosed in NPL 1 referenced below, it has been studied in LTE-A, in order for a mobile station device to simultaneously transmit multiple receipt acknowledgements and the scheduling request, (i) to allow the mobile station device to perform common coding (joint coding) on information bits including information bits of multiple receipt acknowledgements and information bits of the scheduling request, (ii) to allow the mobile station device to modulate the coded bits, and (iii) to allow the mobile station device to transmit a modulation symbol on the physical uplink control channel using the DFT-S-OFDM scheme.

CITATION LIST

Non Patent Literature

NPL 1: 3GPP TSG RAN1 #61bis, Dresden, Germany, 28 Jun.-2 Jul., 2010, R1-103729 "UCI multiplexing for LTE-A"

SUMMARY OF INVENTION

Technical Problem

The configuration in which multiple receipt acknowledgements and the scheduling request are collectively coded and the coded signal (specifically the aforementioned modulation symbol) is transmitted on the physical uplink control channel following the DFT-S-OFDM scheme (hereinafter also referred to as "first configuration") causes degradation of the signal coding characteristic, as compared with a configuration in which only multiple receipt acknowledgments are coded and the coded signal is transmitted on the physical uplink control channel following the DFT-S-OFDM scheme (hereinafter also referred to as "second configuration"). Therefore, the first configuration has a problem that the base station device has a degraded characteristic of receiving receipt acknowledgements, as compared with the second configuration.

The present invention has been made in view of the problems above, and an object of the invention is to provide a mobile station device capable of controlling transmission power of an uplink signal and allowing a base station device to appropriately obtain information from an uplink signal transmitted from the mobile station device, a communication system including a base station device and a mobile station device, a communication method for use in a mobile station device, and an integrated circuit and a circuit device mounted on a mobile station device to cause the mobile station device to perform multiple functions.

Solution to Problem (1) According to an aspect of the present invention, a mobile station device communicates with a base station device. The mobile station device includes: a management unit generating, as uplink control information, a receipt acknowledgement indicating a positive acknowledgement or a negative acknowledgement for downlink data, and a scheduling request indicating whether to request the base station device to allocate a radio resource; a parameter setting unit setting a value of a parameter relevant to transmission power in accordance with the number of bits of information bits of the receipt acknowledgement and information bits of the scheduling request, in response to generation of the receipt acknowledgement and the scheduling request by the management unit; and a transmission unit controlling, by means of the parameter with the set value, the transmission power for a physical uplink control channel used for transmitting a first signal generated from the information bits of the receipt acknowledgement and the information bits of the scheduling request, and transmitting the first signal to the base station device using the physical uplink control channel with the controlled transmission power.

Thus, the mobile station device sets a value of the parameter relevant to transmission power in accordance with the number of information bits of the receipt acknowledgement (ACK/NACK) and the scheduling request (SR), and uses the set parameter value to control the transmission power for a physical uplink control channel (PUCCH) used for transmitting a signal generated from the information bits of the receipt acknowledgement and the scheduling request, so that the base station device can obtain, with appropriate receipt characteristics, information of the receipt acknowledgement and the scheduling request from the received physical uplink control channel.

(2) Preferably, a plurality of physical uplink control channels are present. The transmission unit applies common coding to the information bits of the receipt acknowledgement and the information bits of the scheduling request to generate the first signal, and transmits the generated first signal on a single physical uplink control channel.

Thus, the mobile station device applies common coding to the information bits of the receipt acknowledgement and the scheduling request to generate a signal and transmits the generated signal on a single physical uplink control channel. Therefore, the mobile station device can use the value of the parameter relevant to the transmission power that is set in accordance with the number of information bits of the receipt acknowledgement and the scheduling request to control the transmission power for the physical uplink control channel, and thereby adapt to change of coding characteristics. The base station device can accordingly obtain information of the receipt acknowledgement and the scheduling request, with appropriate receipt characteristics.

(3) Preferably, when in case that the management unit generates only the receipt acknowledgement, of the receipt acknowledgement and the scheduling request, the parameter setting unit sets the value of the parameter in accordance with the number of bits of the information bits of the receipt acknowledgement. The transmission unit controls the transmission power for the physical uplink control channel used for transmitting a second signal generated from the information bits of the receipt acknowledgement, using the parameter with the value which is set by the parameter setting unit in accordance with the number of bits of the information bits of the receipt acknowledgment.

Thus, in the case where only the receipt acknowledgement is generated, the mobile station device controls the transmission power for the physical uplink control channel used for transmitting a signal which is generated from the information bits of the receipt acknowledgement, using the value of the parameter relevant to the transmission power in accordance with the number of information bits of the receipt acknowledgment, and accordingly, transmission power of a smaller value, as compared with the case where a signal generated from the information bits of the receipt acknowledgement and scheduling request is transmitted on the physical uplink control channel, can be set. The base station device can accordingly obtain information of the receipt acknowledgment, with appropriate receipt characteristics, from the received physical uplink control channel. Moreover, the base station device can reduce interference with signals of other mobile station devices.

(4) According to another aspect of the present invention, a communication system includes a mobile station device and a base station device communicating with each other. The mobile station device includes: a management unit generating, as uplink control information, a receipt acknowledgement indicating a positive acknowledgement or a negative acknowledgement for downlink data, and a scheduling request indicating whether to request the base station device to allocate a radio resource; a parameter setting unit setting a value of a parameter relevant to transmission power in accordance with the number of bits of information bits of the receipt acknowledgement and information bits of the scheduling request, in response to generation of the receipt acknowledgement and the scheduling request by the management unit; and a transmission unit controlling, by means of the parameter with the set value, the transmission power for a physical uplink control channel used for transmitting a signal generated from the information bits of the receipt acknowledgement and the information bits of the scheduling request, and transmitting the signal to the base station device using the physical uplink control channel with the controlled transmission power. The base station device includes a reception unit receiving the physical uplink control channel transmitted from the mobile station device.

Thus, the mobile station device sets the value of the parameter relevant to the transmission power in accordance with the number of information bits of the receipt acknowledgement and the scheduling request, and uses the set parameter value to control the transmission power for the physical uplink control channel used for transmitting a signal generated from the information bits of the receipt acknowledgement and the scheduling request, and transmits the physical uplink control channel. Accordingly, the base station device can obtain information of the receipt acknowledgement and the scheduling request, with appropriate receipt characteristics, from the received physical uplink control channel.

(5) According to still another aspect of the present invention, a communication method is a method used in a mobile station device communicating with a base station device. The communication method includes the steps of: the mobile station device generating, as uplink control information, a receipt acknowledgement indicating a positive acknowledgement or a negative acknowledgement for downlink data, and a scheduling request indicating whether to request the base station device to allocate a radio resource; the mobile station device setting a value of a parameter relevant to transmission power in accordance with the number of bits of information bits of the receipt acknowledgement and information bits of the scheduling request, in response to generation of the receipt acknowledgement and the scheduling request; the mobile station device controlling, by means of the parameter with the set value, the transmission power for a physical uplink control channel used for transmitting a signal generated from the information bits of the receipt acknowledgement and the information bits of the scheduling request; and the mobile station device transmitting the signal to the base station device using the physical uplink control channel with the controlled transmission power.

Thus, the mobile station device sets the value of the parameter relevant to the transmission power in accordance with the number of information bits of the receipt acknowledgement and the scheduling request, and uses the set parameter value to control the transmission power for the physical uplink control channel used for transmitting a signal generated from the information bits of the receipt acknowledgement and the scheduling request, and transmits the physical uplink control channel. Accordingly, the base station device can obtain information of the receipt acknowledgement and the scheduling request, with appropriate receipt characteristics, from the received physical uplink control channel.

(6) According to a further aspect of the present invention, an integrated circuit is mounted on a mobile station device for causing the mobile station device to perform a plurality of functions. The integrated circuit causes the mobile station device to perform: a first function of generating, as uplink control information, a receipt acknowledgement indicating a positive acknowledgement or a negative acknowledgement for downlink data, and a scheduling request indicating whether to request the base station device to allocate a radio resource; a second function of setting a value of a parameter relevant to transmission power in accordance with the number of bits of information bits of the receipt acknowledgement and information bits of the scheduling request, in response to generation of the receipt acknowledgement and the scheduling request; a third function of controlling, by means of the parameter with the set value, the transmission power for a physical uplink control channel used for transmitting a signal generated from the information bits of the receipt acknowledgement and the information bits of the scheduling request; and a fourth function of transmitting the signal to the base station device using the physical uplink control channel with the controlled transmission power.

Thus, the integrated circuit sets the value of the parameter relevant to the transmission power in accordance with the number of information bits of the receipt acknowledgement and the scheduling request, and uses the set parameter value to control the transmission power for the physical uplink control channel used for transmitting a signal generated from the information bits of the receipt acknowledgement and the scheduling request, and transmits the physical uplink control channel. Accordingly, the base station device can obtain information of the receipt acknowledgement and the scheduling request, with appropriate receipt characteristics, from the received physical uplink control channel.

(7) According to a further aspect of the present invention, a circuit device is mounted on a mobile station device to cause the mobile station device to perform a plurality of functions. The circuit device includes: a first circuit generating, as uplink control information, a receipt acknowledgement indicating a positive acknowledgement or a negative acknowledgement for downlink data, and a scheduling request indicating whether to request a base station device to allocate a radio resource; a second circuit setting a value of a parameter relevant to transmission power in accordance with the number of bits of information bits of the receipt acknowledgement and information bits of the scheduling request, in response to generation of the receipt acknowledgement and the scheduling request; a third circuit controlling, by means of the parameter with the set value, the transmission power for a physical uplink control channel used for transmitting a signal generated from the information bits of the receipt acknowledgement and the information bits of the scheduling request; and a fourth circuit transmitting the signal to the base station device using the physical uplink control channel with the controlled transmission power.

Thus, the circuit device sets the value of the parameter relevant to the transmission power in accordance with the number of information bits of the receipt acknowledgement and the scheduling request, and uses the set parameter value to control the transmission power for the physical uplink control channel used for transmitting a signal generated from the information bits of the receipt acknowledgement and the scheduling request, and transmits the physical uplink control channel. Accordingly, the base station device can obtain information of the receipt acknowledgement and the scheduling request, with appropriate receipt characteristics, from the received physical uplink control channel.

Advantageous Effects of Invention

In accordance with the present invention, the base station device can appropriately obtain information from an uplink signal transmitted from a mobile station device.

BRIEF DESCRIPTION OF DRAWINGS

FIG. 7 is a diagram illustrating a correspondence between the number of information bits of ACK/NACK and SR, and the value of a parameter relevant to transmission power used by a mobile station device according to an embodiment of the present invention.

DESCRIPTION OF EMBODIMENTS

In the following, an embodiment of the present invention will be described in detail with reference to the drawings. First, FIGS. 9 to 11 will be used to describe an overall image of a communication system and a configuration of a radio frame for example according to the present embodiment. Next, FIGS. 1 to 6 will be used to describe a configuration of the communication system according to the present embodiment. Then, FIGS. 7 and 8 will be used to describe operation and processing of the communication system according to the present embodiment.

<A. Overall Image of Communication System>

Figure 9:
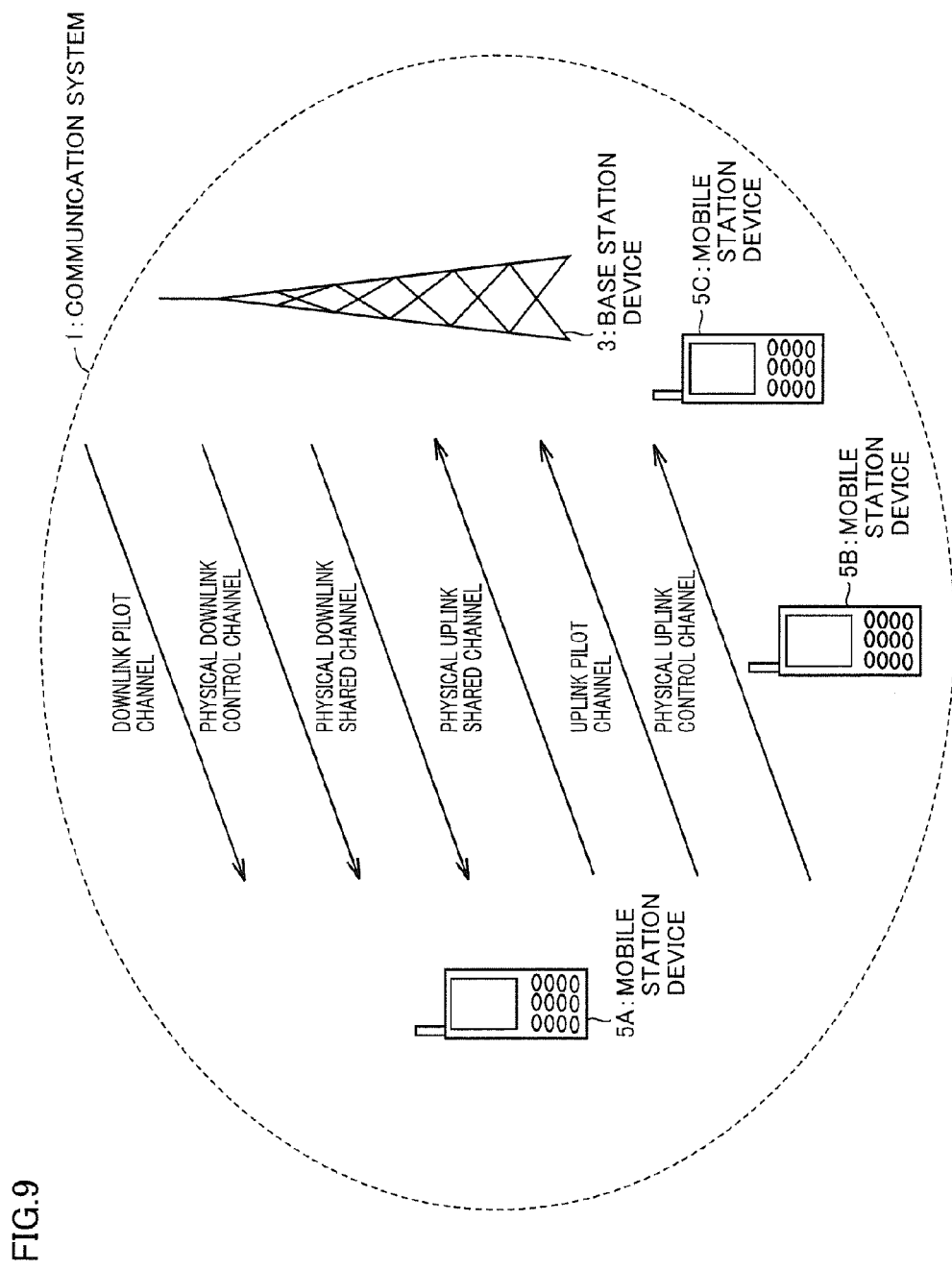
FIG. 9 is a diagram schematically illustrating an overall image of a communication system according to an embodiment of the present invention.

FIG. 9 is a diagram schematically illustrating an overall image of a communication system according to an embodiment of the present invention. Referring to FIG. 9, in communication system 1, a base station device (also referred to as "eNodeB" or "NodeB") 3 and a plurality of mobile station devices (also referred to as "UE") 5A, 5B, 5C communicate with each other.

Downlink, which is the direction of communication from base station device 3 to mobile station devices 5A, 5B, 5C, is configured to include a downlink pilot channel, a physical downlink control channel (PDCCH), and a physical downlink shared channel (PDSCH). Uplink, which is the direction of communication from mobile station devices 5A, 5B, 5C to base station device 3, is configured to include a physical uplink shared channel (PUSCH), an uplink pilot channel, and a physical uplink control channel (PUCCH).

"Channel" means a medium used for signal transmission. "PDSCH" is a channel used for transmitting/receiving downlink data. "PDCCH" is a channel used for transmitting/receiving downlink control information. "PUSCH" is a channel used for transmitting/receiving at least uplink data. "PUCCH" is a channel used for transmitting/receiving uplink control information (UCI).

As the UCI, a receipt acknowledgement (ACK/NACK) indicating positive acknowledgement (ACK) or negative acknowledgement (NACK) in response to downlink data on PDSCH, as well as a scheduling request (SR) indicating whether a request is made for resource allocation, for example, are used. Other channels may include a synchronization channel (SCH) used for establishing downlink synchronization, a physical random access channel (PRACH) used for establishing uplink synchronization, and a physical broadcast channel (PBCH) used for transmitting downlink system information, for example.

An area covered by base station device 3 is called "cell." Mobile station devices 5A, 5B, 5C will collectively be referred to as "mobile station device 5" herein.

<B. Carrier Aggregation>

In communication system 1, multiple frequency bands of predetermined frequency bandwidths are used for communication. Namely, base station device 3 and a plurality of mobile station devices 5 perform carrier aggregation (spectrum aggregation, frequency aggregation). Here, one frequency band is a component carrier.

Specifically, in the communication using the carrier aggregation, each downlink component carrier transmits/receives a downlink channel, and each uplink component carrier transmits/receives an uplink channel. Namely, in communication system 1 using the carrier aggregation, base station device 3 and a plurality of mobile station devices 5 simultaneously transmit/receive signals on multiple channels using multiple component carriers for uplink and downlink.

In communication system 1 using the carrier aggregation, one cell is made up of one downlink component carrier or a set of downlink component carriers and an uplink component carrier. Namely, communication system 1 includes multiple cells.

<C. Configuration of Downlink Radio Frame>

Figure 10:
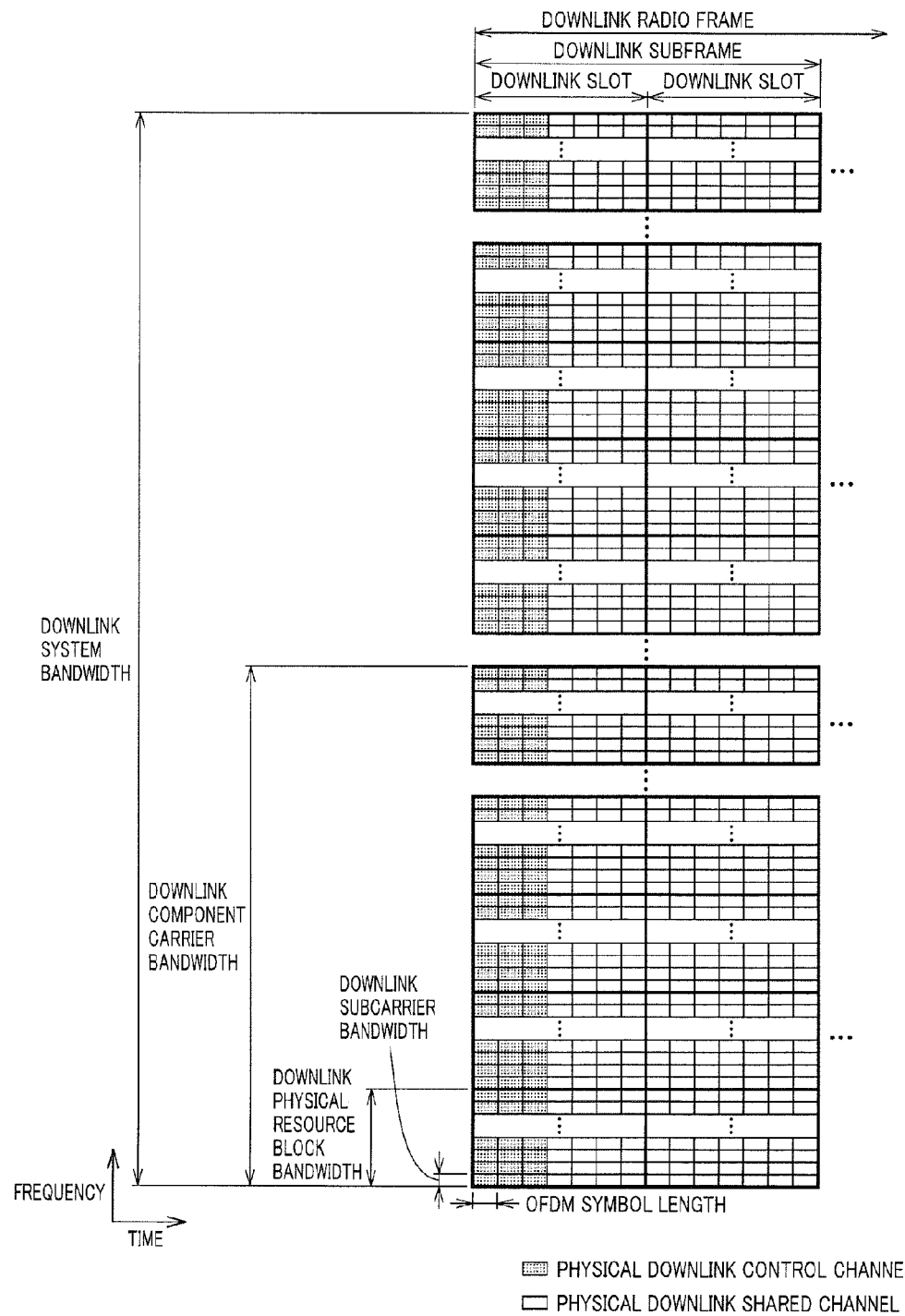
FIG. 10 is a diagram showing a schematic configuration of a radio frame of downlink from a base station device to a mobile station device according to an embodiment of the present invention.

FIG. 10 is a diagram showing a schematic configuration of a radio frame for downlink (hereinafter referred to as "downlink radio frame") from base station device 3 to mobile station device 5. Referring to FIG. 10, the horizontal axis represents the time domain and the vertical axis represents the frequency domain. The downlink radio frame consists of pairs of physical resource blocks (PRB) (hereinafter referred to as "physical resource block pairs") having a predetermined downlink frequency bandwidth and a predetermined downlink time length and serving as units based on which resources are allocated for example. One pair of downlink physical resource blocks (hereinafter referred to as "downlink physical resource block pair") consists of two physical resource blocks (hereinafter referred to as "downlink physical resource blocks") that are consecutive in the downlink time domain.

One downlink physical resource block consists of 12 subcarriers (referred to as downlink subcarriers) in the downlink frequency domain and seven OFDM (Orthogonal Frequency Division Multiplexing) symbols in the time domain. The system band of downlink (referred to as downlink system band) is a downlink communication band of base station device 3. The system bandwidth of downlink (hereinafter referred to as "downlink system bandwidth") consists of multiple downlink component carriers' bandwidths (hereinafter "downlink component carrier bandwidths"). In communication system 1, the downlink component carrier is a band of a predetermined frequency bandwidth, and a downlink component carrier bandwidth is a frequency bandwidth of a downlink component carrier. For example, a downlink system band with a frequency bandwidth of 40 MHz consists of two downlink component carriers with a frequency bandwidth of 20 MHz.

In the downlink component carrier, multiple downlink physical resource blocks are mapped depending on the downlink component carrier bandwidth. For example, a downlink component carrier having a frequency bandwidth of 20 MHz consists of 100 downlink physical resource blocks. For example, the downlink component carrier bandwidth is a frequency bandwidth that can be used by mobile station device 5 conforming to LTE, and the downlink system bandwidth is a frequency bandwidth that can be used by mobile station device 5 conforming to LTE-A.

In the time domain, a slot (hereinafter referred to as "downlink slot") consists of seven OFDM symbols, a subframe (referred to as downlink subframe) consists of two downlink slots, and a downlink radio frame consists of 10 downlink subframes. Here, a unit having one downlink subcarrier and one OFDM symbol will be referred to as "downlink resource element." In each downlink subframe, at least PDSCH used for transmitting information data (transport block) and PDCCH used for transmitting control information are mapped. PDCCH consists of first to third OFDM symbols of the downlink subframe. PDSCH consists of fourth to fourteenth OFDM symbols of the downlink subframe.

Downlink pilot channels (not shown) used for transmitting a reference signal (RS) of downlink are mapped in a dispersed manner in multiple downlink resource elements. In the following, a reference signal of downlink is referred to as "downlink reference signal." The downlink reference signal is also called "cell specific RS." Here, the downlink reference signal is a known signal in communication system 1 and used for estimating propagation path variations for PDSCH and PDCCH. The number of downlink resource elements constituting the downlink reference signal depends on the number of transmission antennas used by base station device 3 for communication to mobile station device 5.

One PDSCH consists of one or more downlink physical resource blocks in the same downlink component carrier. One PDCCH consists of multiple downlink resource elements in the same downlink component carrier. In the downlink system band, multiple PDSCHs and multiple PDCCHs are mapped.

Base station device 3 can map, for one mobile station device 5 conforming to LTE, one PDCCH including control information about PDSCH resource allocation and one PDSCH in the same downlink component carrier in the same downlink subframe. Base station device 3 can also map, for one mobile station device 5 conforming to LTE-A, multiple PDCCHs including control information about PDSCH resource allocation and multiple PDSCHs in the same downlink subframe.

Base station device 3 can map, for one mobile station device 5 conforming to LTE-A, multiple PDCCHs including control information about allocation of multiple PDSCH resources, in the same downlink component carrier in the same downlink subframe. Base station device 3, however, cannot map multiple PDSCHs in the same downlink component carrier. Base station device 3 can map respective PDSCHs in different downlink component carriers, respectively.

On PDCCH, a signal is mapped that is generated from control information such as information indicating allocation of a downlink physical resource block to PDSCH, information indicating allocation of an uplink physical resource block to PUSCH, mobile station identifier (RNTI (Radio Network Temporary Identifier)), modulation scheme, code rate, retransmission parameter, information about multi-antenna, transmission power control command (TPC command) and the like. The control information included in PDCCH is referred to as downlink control information (DCI). DCI including information indicating allocation of a downlink physical resource block to PDSCH is referred to as downlink assignment, and DCI including information indicating allocation of an uplink physical resource block to PUSCH is referred to as uplink grant. The downlink assignment is also referred to as "DL assignment" or "downlink grant" and the uplink grant is also referred to as "UL grant."

The downlink assignment includes a transmission power control command for PUCCH. The uplink assignment includes a transmission power control command for PUSCH. One PDCCH includes only the information indicating allocation of one PDSCH resource or information indicating allocation of one PUSCH resource. Namely, one PDCCH does not include information indicating allocation of multiple PDSCH resources or information indicating allocation of multiple PUSCH resources.

<D. Configuration of Uplink Radio Frame>

Figure 11:
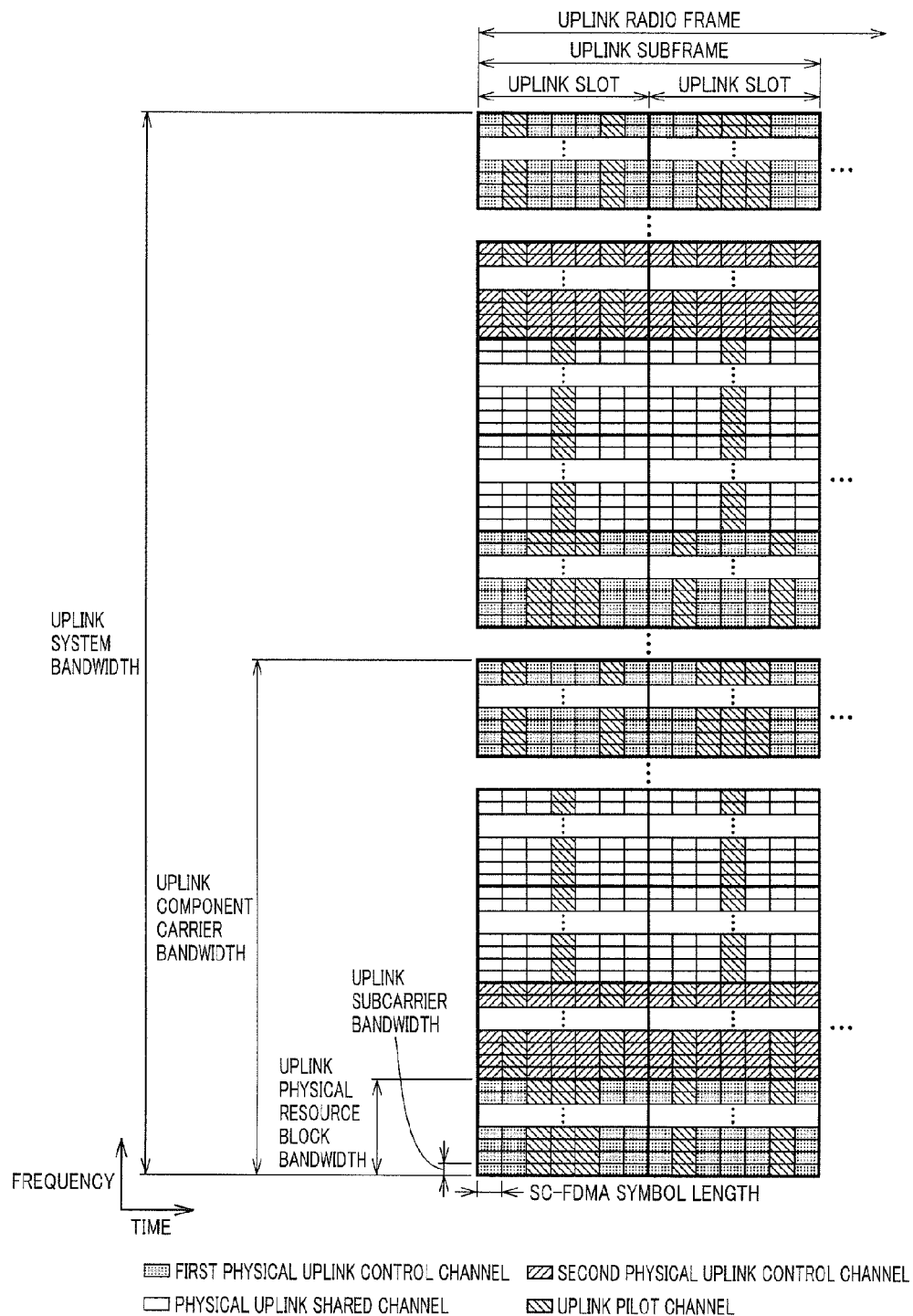
FIG. 11 is a diagram showing a schematic configuration of a radio frame of uplink from a mobile station device to a base station device according to an embodiment of the present invention.

FIG. 11 is a diagram showing a schematic configuration of a radio frame for uplink (hereinafter referred to as "uplink radio frame") from mobile station device 5 to base station device 3. Referring to FIG. 11, the horizontal axis represents the time domain and the vertical axis represents the frequency domain. The uplink radio frame consists of pairs of physical resource blocks (hereinafter referred to as "uplink physical resource block pairs") having a predetermined uplink frequency bandwidth and a predetermined uplink time length and serving as units based on which radio resources are allocated for example. One uplink physical resource block pair consists of two physical resource blocks for uplink (hereinafter referred to as "uplink physical resource blocks") that are consecutive in the uplink time domain.

One uplink physical resource block consists of 12 subcarriers (hereinafter referred to as "uplink subcarriers") in the uplink frequency domain and seven SC-FDMA (Single-Carrier Frequency Division Multiple Access) symbols in the time domain. The system band of uplink (hereinafter referred to as "uplink system band") is an uplink communication band of base station device 3. The system bandwidth of uplink (hereinafter referred to as "uplink system bandwidth") consists of multiple frequency bandwidths of uplink component carriers for uplink (hereinafter referred to as "uplink component carrier bandwidths"). In communication system 1, the uplink component carrier is a band of a predetermined frequency bandwidth, and the uplink component carrier bandwidth is a frequency bandwidth of an uplink component carrier. For example, the system band of uplink (uplink system band) having a frequency bandwidth of 40 MHz consists of two uplink component carriers having a frequency bandwidth of 20 MHz.

In the uplink component carrier, multiple uplink physical resource blocks are mapped depending on the uplink component carrier bandwidth. For example, an uplink component carrier having a frequency bandwidth of 20 MHz consists of 100 uplink physical resource blocks. The uplink component carrier bandwidth is, for example, a frequency bandwidth that can be used for communication by mobile station device 5 conforming to LTE. The uplink system bandwidth is, for example, a frequency bandwidth that can be used for communication by mobile station device 5 conforming to LTE-A.

In the time domain, a slot (hereinafter referred to as "uplink slot") consists of seven SC-FDMA symbols, a subframe (hereinafter referred to as "uplink subframe") consists of two uplink slots, and an uplink radio frame consists of 10 uplink subframes. A unit having one uplink subcarrier and one SC-FDMA symbol is called "uplink resource element."

In each uplink subframe, at least PUSCH used for transmitting information data and PUCCH used for transmitting uplink control information (UCI) are mapped. PUCCH includes two different PUCCHs, namely first PUCCH and second PUCCH. The first PUCCH is used for transmitting UCI (ACK/NACK) indicating positive acknowledgement (ACK) or negative acknowledgement (NACK) in response to data received by means of PDSCH in the case where carrier aggregation is not used, UCI (scheduling request: SR) at least indicating whether uplink resource allocation is requested, and UCI (channel quality indicator (CQI)) indicating the downlink reception quality (also referred to as "channel quality"). The second PUCCH is used for transmitting ACK/NACK in the case where carrier aggregation is used and transmitting SR. SR is transmitted on the second PUCCH when SR is transmitted simultaneously with ACK/NACK which is made where carrier aggregation is used, and transmitted on the first PUCCH when only the SR is transmitted.

In the case where mobile station device 5 is to indicate to base station device 3 a request for uplink resource allocation, mobile station device 5 transmits a signal on the first PUCCH which is used for transmitting SR, or transmits SR indicating a request for uplink resource allocation on the second PUCCH. Base station device 3 recognizes, from the result that the signal is detected with a resource of the first PUCCH which is used for transmitting SR, that mobile station device 5 requests uplink resource allocation, or recognizes that mobile station device 5 requests uplink resource allocation, from UCI obtained by decoding a signal transmitted on the second PUCCH.

In the case where mobile station device 5 is to indicate to base station device 3 the fact that it does not request uplink resource allocation, mobile station device 5 transmits no signal with a resource of the first PUCCH for transmitting SR that is allocated in advance, or transmits on the second PUCCH, SR indicating that no request is made for uplink resource allocation. Base station device 3 recognizes that mobile station device 5 does not request uplink resource allocation, from the result that no signal is detected with the resource of the first PUCCH for transmitting SR, or recognizes that mobile station device 5 does not request uplink resource allocation, from UCI obtained by decoding a signal transmitted on the second PUCCH.

The second PUCCH may also be used for transmitting CQI. The first PUCCH and/or second PUCCH may also be used for transmitting control information (channel state information: CSI) indicating the downlink channel state. The first PUCCH used for transmitting UCI including ACK/NACK, the first PUCCH used for transmitting UCI including SR, and the first PUCCH used for transmitting UCI including CQI have different signal configurations respectively. The second PUCCH used for transmitting only ACK/NACK which is made where carrier aggregation is used, and the second PUCCH used for transmitting ACK/NACK which is made where carrier aggregation is used and transmitting SR have different signal configurations respectively. Specifically, the second PUCCH has a signal configuration to which DFT-S-OFDM scheme is applied.

One PUSCH consists of one or more uplink physical resource blocks in the same uplink component carrier. One first PUCCH consists of two uplink physical resource blocks that are symmetrical in terms of the frequency domain in the same uplink component carrier and located in different uplink slots. One second PUCCH consists of two uplink physical resource blocks in the same uplink component carrier.

For example, referring to FIG. 11, in the uplink subframe in the uplink component carrier of the lowest frequency, the uplink physical resource block of the lowest frequency of the first uplink slot and the uplink physical resource block of the highest frequency of the second uplink slot constitute one pair of uplink physical resource blocks used for the first PUCCH. For example, referring to FIG. 11, in the uplink subframe in the uplink component carrier of the lowest frequency, the uplink physical resource block of the second lowest frequency of the first uplink slot and the uplink physical resource block of the second lowest frequency of the second uplink slot constitute one pair of uplink physical resource blocks used for the second PUCCH.

In the embodiment of the present invention, it is supposed that the second PUCCH consists of one uplink physical resource block pair. The second PUCCH may consist of two uplink physical resource blocks that are symmetrical in terms of the frequency domain in the same uplink component carrier and located in different uplink slots, or consist of multiple uplink physical resource block pairs.

In the uplink system band, one or more PUSCHs and one or more first PUCCHs are mapped. In the case where communication using carrier aggregation is performed between base station device 3 and mobile station device 5, one or more second PUCCHs are mapped in the uplink system band.

Mobile station device 5 conforming to LTE can map a PUCCH resource and a PUSCH resource in the same uplink component carrier and transmit a signal. Base station device 3 can allocate to mobile station device 5 conforming to LTE, different first PUCCH resources for ACK/NACK which is made in the case where carrier aggregation is not used, SR, and CQI respectively. It should be noted that mobile station device 5 conforming to LTE uses only one first PUCCH resource in the same uplink subframe. Mobile station device 5 conforming to LTE uses only the PUSCH resource in the case where a first PUCCH resource and the PUSCH resource are allocated in the same uplink subframe.

Base station device 3 can allocate one PUSCH resource per uplink component carrier to one mobile station device 5 conforming to LTE-A. In the case where PUSCH resources are allocated in multiple uplink component carriers in the same uplink subframe, mobile station device 5 conforming to LTE-A can use multiple PUSCH resources.

Base station device 3 cannot allocate multiple PUSCH resources in the same uplink component carrier in the same uplink subframe, to one mobile station device 5 conforming to LTE-A. It should be noted that base station device 3 can allocate respective PUSCH resources to different uplink component carriers, respectively.

Base station device 3 can allocate, to one mobile station device 5 conforming to LTE-A, one or more first PUCCH resources in one uplink component carrier. In the case where multiple first PUCCH resources are allocated in the same uplink subframe, mobile station device 5 conforming to LTE-A uses any one of the PUCCH resources. In such a case, which of the first PUCCH resources is to be selected by mobile station device 5 is determined in accordance with a specified rule.

In addition, base station device 3 can allocate, to one mobile station device 5 conforming to LTE-A, one resource for the second PUCCH in one uplink component carrier. A resource for the first PUCCH and a resource for the second PUCCH allocated to mobile station device 5 are resources in the same uplink component carrier.

The uplink pilot channel is mapped to a different SC-FDMA symbol depending on whether it is mapped in the same uplink physical resource block as PUSCH, mapped in the same uplink physical resource block as the first PUCCH, or mapped in the same uplink physical resource block as the second PUCCH, or to the same SC-FDMA symbol. The uplink pilot channel is used for transmitting an uplink reference signal (UL RS). Here, the uplink reference signal is a known signal in communication system 1 and used for estimating propagation path variations for PUSCH and PUCCH.

In the case where the uplink pilot channel is mapped in the same uplink physical resource block as PUSCH, it is mapped to the fourth SC-FDMA symbol in the uplink slot. In the case where the uplink pilot channel is mapped in the same uplink physical resource block as the first PUSCH including ACK/NACK in the case where carrier aggregation is not used, it is mapped to the third, fourth, and fifth SC-FDMA symbols in the uplink slot. In the case where the uplink pilot channel is mapped in the same uplink physical resource block as the first PUCCH including SR, it is mapped to the third, fourth, and fifth SC-FDMA symbols in the uplink slot. In the case where the uplink pilot channel is mapped in the same uplink physical resource block as the first PUCCH including CQI, it is mapped to the second and sixth SC-FDMA symbols in the uplink slot. In the case where the uplink pilot channel is mapped in the same uplink physical resource block as the second PUCCH, it is mapped to the second and sixth SC-FDMA symbols in the uplink slot.

In contrast to the above-described mapping of the uplink pilot channel, the uplink pilot channel may be mapped to different SC-FDMA symbols. For example, in the case where the uplink pilot channel is mapped in the same uplink physical resource block as the second PUCCH, it may be mapped to the third, fourth, and fifth SC-FDMA symbols in the uplink slot.

While FIG. 11 shows the case where the first PUCCH is mapped to the endmost uplink physical resource blocks of each uplink component carrier, an uplink physical resource block such as second or third one from the end of the uplink component carrier may be used for the first PUCCH. In addition, while FIG. 11 shows the case where the second PUCCH is mapped to the uplink physical resource block of the uplink component carrier of the lowest frequency, an uplink physical resource block of an uplink component carrier such as the second or third one from the end of the uplink system band may be used for the second PUCCH. Moreover, while FIG. 11 shows the case where the second PUCCH is mapped to the second uplink physical resource block from the end of the uplink component carrier, an uplink physical resource block such as third or fourth one from the end of the uplink component carrier may be used for the second PUCCH.

For the first PUCCH, code multiplexing in the frequency domain and code multiplexing in the time domain are used. Multiple first PUCCHs are mapped to the same uplink physical resource block. To respective first PUCCHs, different codes are allocated. The allocated codes can be used to implement code multiplexing in the frequency domain or time domain.

For the first PUCCH used for transmitting ACK/NACK in the case where carrier aggregation is not used, code multiplexing in the frequency domain and the time domain is used. For the first PUCCH used for transmitting SR, code multiplexing in the frequency domain and the time domain is used. For the first PUCCH used for transmitting CQI, code multiplexing in the frequency domain is used.

For the second PUCCH, code multiplexing in the time domain is used. Multiple second PUCCHs are mapped to the same uplink physical resource block. For respective second PUCCHs, different codes are used. Code multiplexing in the time domain is implemented. For the sake of simplifying the description, the description of the details of code multiplexing for the first PUCCH and second PUCCH may not be given as appropriate.

In communication system 1, the OFDM scheme is applied to the downlink and the N×DFT-Spread OFDM scheme is applied to the uplink. Here, "N×DFT-Spread OFDM scheme" is a scheme according to which a signal is transmitted/received on the basis of the uplink component carrier using the DFT-Spread OFDM scheme. More specifically, "N×DFT-Spread OFDM scheme" is a scheme according to which an uplink subframe of communication system 1 in which multiple uplink component carriers are included is used to perform communication by means of multiple processing units involved in DFT-Spread OFDM transmission/reception.

A PDSCH resource is mapped, in the time domain, to the same downlink subframe as a downlink subframe to which mapped a resource of PDCCH including a downlink assignment which is used for allocating the aforementioned PDSCH resource. The PDSCH resource is mapped, in the frequency domain, to the same or a different downlink component carrier as or from a downlink component carrier of PDCCH including the downlink assignment used for allocating the aforementioned PDSCH resource.

DCI includes information (hereinafter referred to as "carrier indicator") indicating which downlink component carrier transmits PDSCH associated with a downlink assignment, or which uplink component carrier transmits PUSCH associated with an uplink grant. In the case where a downlink assignment does not include the carrier indicator, the downlink assignment is associated with PDSCH of the same downlink component carrier as a downlink component carrier transmitting the downlink assignment. In the case where an uplink grant does not include the carrier indicator, the uplink grant is associated with PUSCH of an uplink component carrier associated in advance with a downlink component carrier transmitting the uplink grant. Information indicating association between a downlink component carrier and an uplink component carrier that is used for interpreting resource allocation of an uplink grant in the case where DCI does not include the carrier indicator is conveyed, before information data is communicated, from base station device 3 to mobile station device 5 by means of system information.

<E. Cross-CC Scheduling>

A PDCCH and a PDSCH including a downlink assignment associated with this PDCCH may be mapped to different downlink component carriers respectively (hereinafter referred to as "cross CC scheduling"). In the following, a downlink component carrier to which a PDSCH is mapped will be referred to as physical downlink shared channel component carrier (PDSCH CC), and a downlink component carrier to which a PDCCH is mapped will be referred to as physical downlink control channel component carrier (PDCCH CC). In the case where all downlink component carriers used for carrier aggregation have a possibility that a PDSCH is mapped thereto, the all downlink component carriers are each PDSCH CC.

Base station device 3 determines which of multiple downlink component carriers used for carrier aggregation is to be employed as a PDCCH CC. Then, base station device 3 determines with which PDSCH CC the PDCCH CC is associated. Here, "association between a PDCCH CC and a PDSCH CC" means that a PDCCH including control information about resource allocation of a PDSCH mapped to the PDSCH CC is mapped to the PDCCH CC associated with the PDSCH CC. More specifically, "association between a PDCCH CC and a PDSCH CC" means that a PDCCH including a downlink assignment which is associated with a PDSCH mapped to the PDSCH CC and which also provides the carrier indicator is mapped to the PDCCH CC associated with the PDSCH CC.

The association described here differs from the association between a downlink component carrier for a PDCCH without the carrier indicator and an uplink component carrier as explained above. Multiple PDSCH CCs used for carrier aggregation may be associated each with the same PDCCH CC, or multiple PDSCH CCs used for carrier aggregation may be associated respectively with different PDCCH CCs. For example, in the case where multiple PDSCH CCs are associated with one PDCCH CC, this PDSCH CC has a PDSCH whose resource allocation is indicated by a PDCCH transmitted by the PDCCH CC is recognized by means of the carrier indicator.

Base station device 3 conveys to mobile station device 5 information indicating a downlink component carrier associated as a PDCCH CC with each PDSCH CC. This information is conveyed by means of radio resource control (RRC) signaling. Based on the information conveyed by means of RRC signaling from base station device 3, mobile station device 5 recognizes a downlink component carrier having a possibility that a PDCCH may be mapped that includes a downlink assignment with the carrier indicator of PDSCH on each PDSCH CC. RRC signaling is conveyed on a PDSCH. In the case where Cross-CC scheduling is not applied, information indicating association between a PDSCH CC and a PDCCH CC is not conveyed from base station device 3 to mobile station device 5. In the case where Cross-CC scheduling is not applied, a downlink assignment does not include the carrier indicator.

<F. Overall Configuration of Base Station Device 3>

Figure 1:
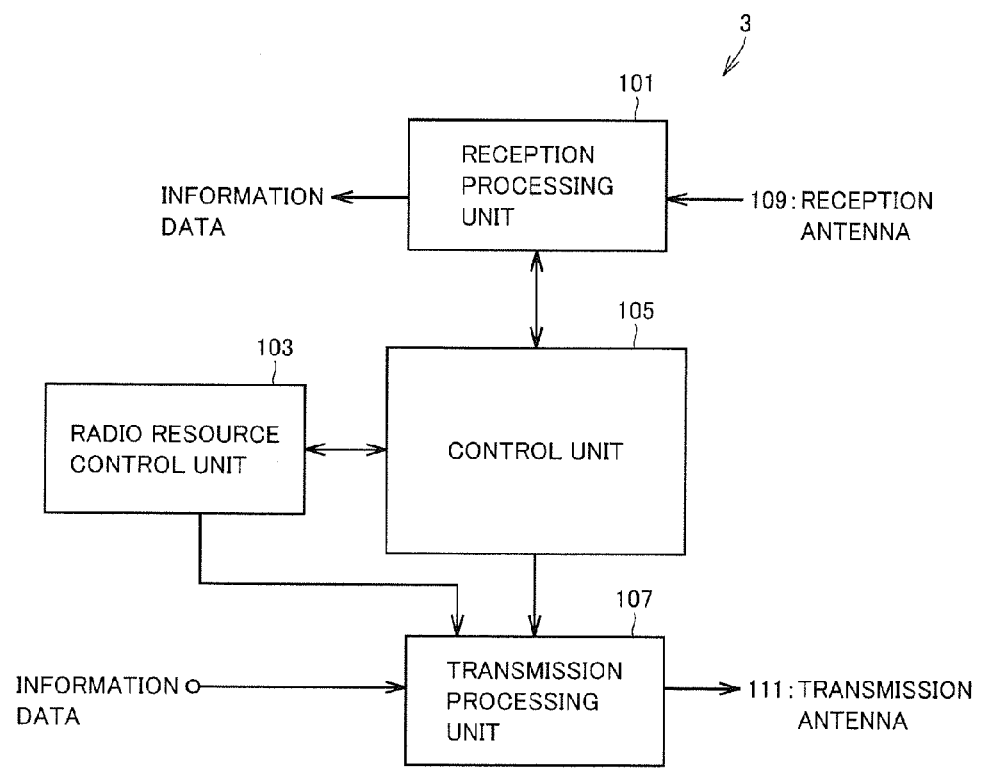
FIG. 1 is a schematic block diagram showing a configuration of a base station device according to an embodiment of the present invention.
Figure 2:
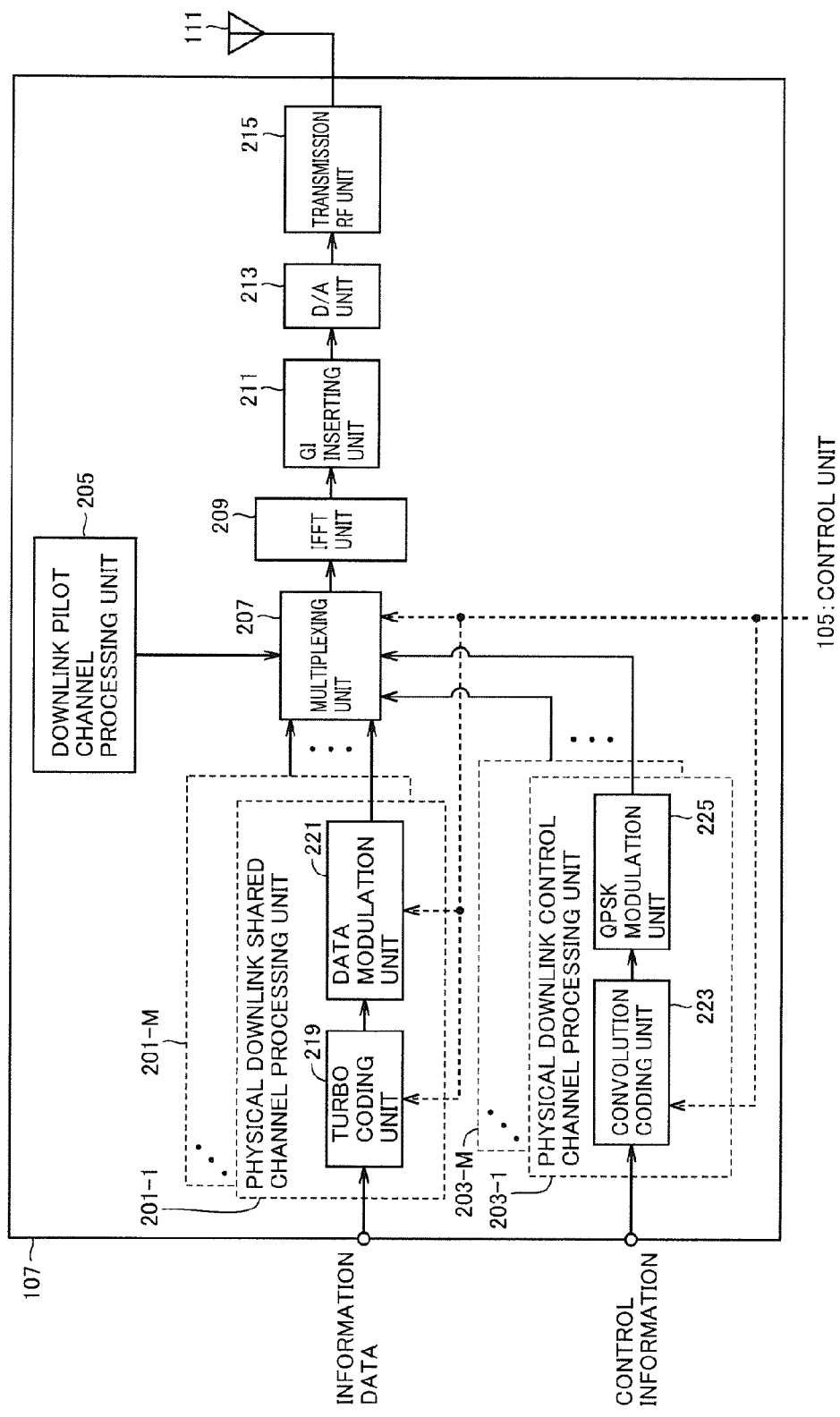
FIG. 2 is a schematic block diagram showing a configuration of a transmission processing unit of the base station device according to an embodiment of the present invention.
Figure 3:
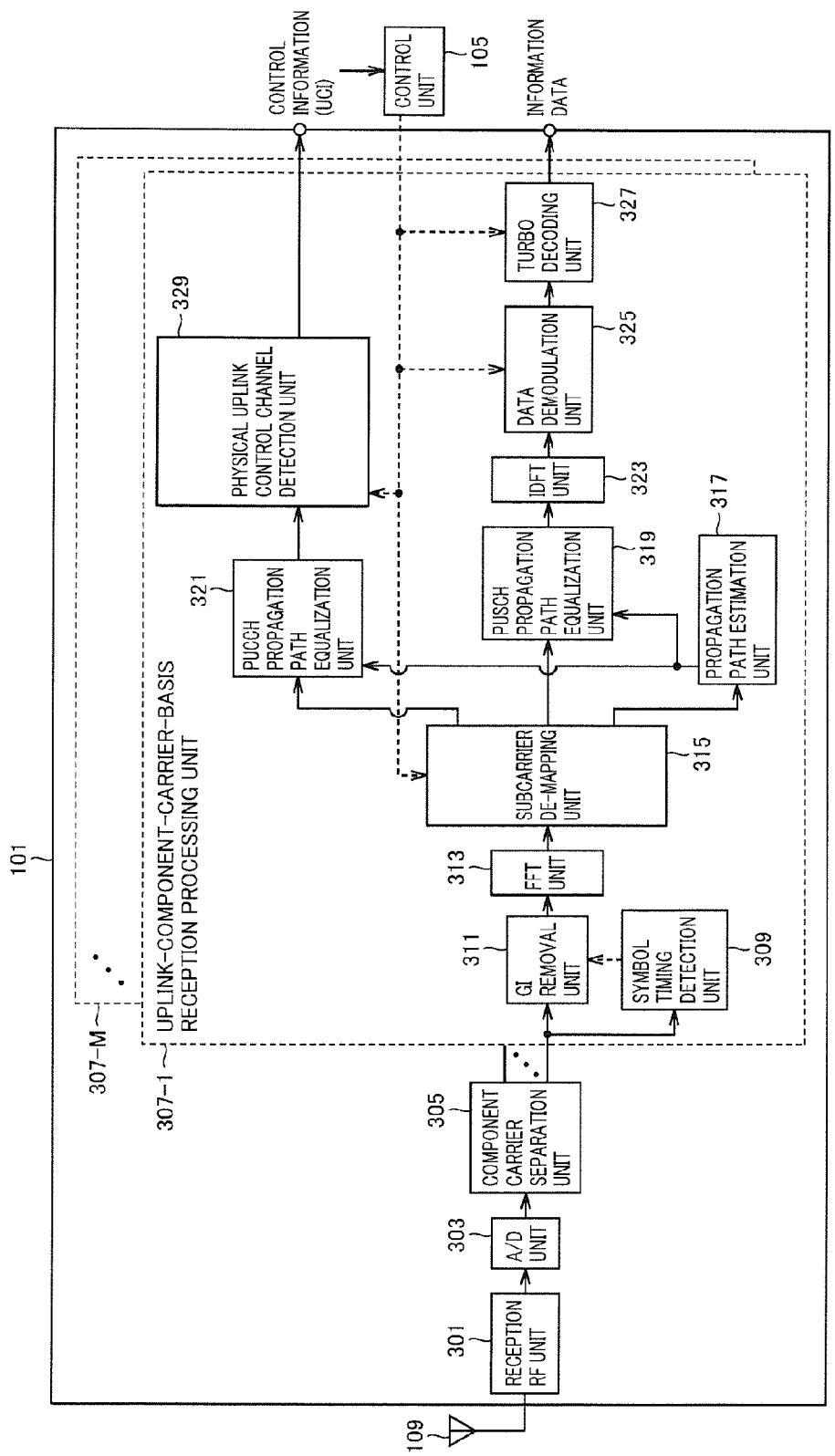
FIG. 3 is a schematic block diagram showing a configuration of a reception processing unit of the base station device according to an embodiment of the present invention.

In the following, FIGS. 1, 2, and 3 will be used to describe a configuration of base station device 3. FIG. 1 is a schematic block diagram showing the configuration of base station device 3. Referring to FIG. 1, base station device 3 is configured to include a reception processing unit 101, a radio resource control unit 103, a control unit 105, and a transmission processing unit 107.

Reception processing unit 101 uses an uplink reference signal to demodulate PUCCH and PUSCH reception signals received by a reception antenna 109 from mobile station device 5, in accordance with an instruction from control unit 105. Reception processing unit 101 also decodes the demodulated reception signals to thereby extract control information and information data. Reception processing unit 101 performs a process of extracting UCI from an uplink subframe and an uplink physical resource block having a PUCCH resource allocated by base station device 3 to mobile station device 5.

Reception processing unit 101 is instructed by control unit 105 to execute a specified process on a specified uplink subframe and a specified uplink physical resource block. For example, reception processing unit 101 is instructed by control unit 105 to execute a detection process in which code multiplication and combining in the time domain are performed on a signal of the second PUCCH. For example, reception processing unit 101 is instructed by control unit 105 to execute a detection process in which code multiplication and combining in the time domain and code multiplication and combining in the frequency domain are performed on a signal of the first PUCCH for SR. Furthermore, reception processing unit 101 receives an instruction from control unit 105 indicating a code in the frequency domain and/or a code in the time domain to be used in the process of detecting UCI from the PUCCH.

Reception processing unit 101 outputs the extracted UCI to control unit 105 and outputs information data to a higher layer. For example, reception processing unit 101 extracts from a reception signal of the second PUCCH, ACK/NACK which is made where carrier aggregation is used and SR. At this time, reception processing unit 101 performs common decoding on ACK/NACK and SR having undergone common coding. Details of reception processing unit 101 will be described later herein.

Radio resource control unit 103 performs for example setting of resource allocation to PDCCH of each mobile station device 5, resource allocation to PUCCH, allocation of a downlink physical resource block to PDSCH, allocation of an uplink physical resource block to PUSCH, and setting of a modulation scheme, a code rate, and a transmission power control value for each of different channels. A part of the information which is set by radio resource control unit 103 is conveyed through transmission processing unit 107 to mobile station device 5. For example, information indicating a part of parameter values relevant to transmission power for PUSCH and information indicating a part of parameter values relevant to transmission power for PUCCH are conveyed to mobile station device 5.

Radio resource control unit 103 also sets, for example, allocation of a PDSCH radio resource based on UCI which is obtained by means of PUCCH by reception processing unit 101 and thereafter input through control unit 105. For example, when ACK/NACK which is made where carrier aggregation is used and obtained by means of the second PUCCH is input, radio resource control unit 103 allocates to mobile station device 5 a PDSCH resource to which NACK is indicated by this ACK/NACK. For example, in the case where an SR obtained by means of the second PUCCH is input and this SR indicates information requesting allocation of an uplink resource, radio resource control unit 103 allocates a PUSCH resource to mobile station device 5.

In the case where communication is performed by means of carrier aggregation, radio resource control unit 103 configures multiple downlink component carriers and multiple uplink component carriers for mobile station device 5. Radio resource control unit 103 also sets a PDCCH CC and a PDSCH CC associated with the PDCCH CC for mobile station device 5. Radio resource control unit 103 outputs to control unit 105 information indicating a downlink component carrier associated as a PDCCH CC with each PDSCH CC so that the information is conveyed to mobile station device 5 through transmission processing unit 107.

Radio resource control unit 103 outputs a variety of control signals to control unit 105. For example, the control signals include a control signal indicating PUCCH resource allocation, and a control signal indicating a detection process performed on a PUCCH signal received by reception processing unit 101. For example, radio resource control unit 103 outputs a control signal indicating a resource of the second PUCCH, specifically an uplink subframe, an uplink physical resource block, and a code of the time domain. For example, radio resource control unit 103 outputs a control signal indicating a detection process of performing multiplication and combining of the code in the time domain, on the signal of the second PUCCH. For example, radio resource control unit 103 outputs a control signal indicating a resource of the first PUCCH for the SR, specifically an uplink subframe, an uplink physical resource block, a code of the time domain, and a code of the frequency domain. For example, radio resource control unit 103 outputs a control signal indicating a detection process of performing multiplication and combining of the code of the time domain and multiplication and combining of the code of the frequency domain, on the signal of the first PUCCH for the SR.

Based on the control signal which is input from radio resource control unit 103, control unit 105 performs, on transmission processing unit 107, control of allocation of a downlink physical resource block to a PDSCH, allocation of a resource to a PDCCH, setting of a modulation scheme for the PDSCH, and setting of a code rate for the PDSCH and PDCCH, for example. Based on the control signal which is input from radio resource control unit 103, control unit 105 also generates DCI to be transmitted on the PDCCH and outputs the generated DCI to transmission processing unit 107. The DCI transmitted on the PDCCH includes a downlink assignment, an uplink grant, and the like. Control unit 105 also performs control so that information indicating a downlink component carrier and an uplink component carrier to be used for communication, and information indicating association between a PDSCH CC and a PDCCH CC, for example, are transmitted on the PDSCH through transmission processing unit 107 to mobile station device 5.

Based on the control signal which is input from radio resource control unit 103, control unit 105 performs, on reception processing unit 101, control of allocation of an uplink physical resource block to a PUSCH, allocation of a resource to a PUCCH, setting of a modulation scheme for the PUSCH and the PUCCH, setting of a code rate for the PUSCH, a detection process for the PUCCH, and setting of a code for the PUCCH, for example. To control unit 105, UCI transmitted on PUCCH by mobile station device 5 is input from reception processing unit 101, and control unit 105 outputs the input UCI to radio resource control unit 103.

Transmission processing unit 107 generates, based on the control signal which is input from control unit 105, signals to be transmitted on the PDCCH and PDSCH, and transmits the generated signals through transmission antenna 111. Transmission processing unit 107 uses the PDSCH to transmit to mobile station device 5 the information that is input from radio resource control unit 103 such as (i) information indicating a downlink component carrier and an uplink component carrier to be used for communication using carrier aggregation, (ii) information indicating association between the PDSCH CC and the PDCCH CC, (iii) information indicating allocation of a resource of the second PUCCH, (iv) information indicating a part of parameter values relevant to transmission power for the PUSCH, (v) information indicating a part of parameter values relevant to transmission power for the PUCCH, and (vi) information data that is input from a higher layer. Transmission processing unit 107 also uses the PDCCH to transmit DCI which is input from control unit 105 to mobile station device 5. For the sake of simplifying the description, it is supposed here that information data includes information about several different types of control. Details of transmission processing unit 107 will be described later herein.

<G. Configuration of Transmission Processing Unit 107 of Base Station Device 3>

In the following, details of transmission processing unit 107 of base station device 3 will be described. FIG. 2 is a schematic block diagram showing a configuration of transmission processing unit 107 of base station device 3. Referring to FIG. 2, transmission processing unit 107 is configured to include: a plurality of physical downlink shared channel processing units 201-1 to 201-M; a plurality of physical downlink control channel processing units 203-1 to 203-M; a downlink pilot channel processing unit 205; a multiplexing unit 207; an IFFT (Inverse Fast Fourier Transform) unit 209; a GI (Guard Interval) inserting unit 211; a D/A (Digital/Analog converter) unit 213; a transmission RF (Radio Frequency) unit 215; and transmission antenna 111.

In the following, physical downlink shared channel processing units 201-1 to 201-M will collectively be referred to as "physical downlink shared channel processing unit 201." Physical downlink control channel processing units 203-1 to 203-M will collectively be referred to as "physical downlink control channel processing unit 203." Physical downlink shared channel processing units 201 are configured and function similarly and physical downlink control channel processing units 203 are also configured and function similarly, and therefore a description will be given of one of the same processing units.

Physical downlink shared channel processing unit 201 includes a turbo coding unit 219 and a data modulation unit 221. Physical downlink control channel processing unit 203 includes a convolution coding unit 223 and a QPSK modulation unit 225. Physical downlink shared channel processing unit 201 performs baseband signal processing for transmitting information data to mobile station device 5 following the OFDM scheme.

Turbo coding unit 219 performs turbo coding on the input information data at a code rate which is input from control unit 105, for the purpose of enhancing error resilience of the data. Turbo coding unit 219 outputs the turbo-coded information data to data modulation unit 221.

Data modulation unit 221 modulates the data coded by turbo coding unit 219 by a modulation scheme which is input from control unit 105 such as QPSK (Quadrature Phase Shift Keying), 16QAM (16 Quadrature Amplitude Modulation), or 64QAM (64 Quadrature Amplitude Modulation), and thereby generates a signal sequence of modulation symbols. Data modulation unit 221 outputs the generated signal sequence to multiplexing unit 207.

Physical downlink control channel processing unit 203 performs baseband signal processing for transmitting DCI, which is input from control unit 105, based on the OFDM scheme. Convolution coding unit 223 performs convolution coding for enhancement of the DCI error resilience, based on the code rate which is input from control unit 105. Here, DCI is controlled bit by bit. Convolution coding unit 223 also performs rate matching to adjust the number of output bits with respect to the bits that have been subjected to the convolution coding, based on the code rate which is input from control unit 105. Convolution coding unit 223 outputs the coded DCI to QPSK modulation unit 225.

QPSK modulation unit 225 modulates the DCI coded by convolution coding unit 223 based on the QPSK modulation scheme, and outputs the modulated signal sequence of modulation symbols to multiplexing unit 207. Downlink pilot channel processing unit 205 generates a downlink reference signal (Cell Specific RS) which is a known signal in mobile station device 5, and outputs the generated downlink reference signal to multiplexing unit 207.

Multiplexing unit 207 multiplexes the signal that is input from downlink pilot channel processing unit 205, the signal that is input from each physical downlink shared channel processing unit 201, and the signal that is input from each physical downlink control channel processing unit 203, on the down link radio frame in accordance with an instruction from control unit 105. Control signals concerning allocation of a downlink physical resource block to the PDSCH and allocation of a resource to the PDCCH that are set by radio resource control unit 103 are input to control unit 105, and control unit 105 controls processing of multiplexing unit 207 based on the control signals.

Multiplexing unit 207 multiplexes the PDSCH and the PDCCH in a time-multiplexing manner as shown in FIG. 10. Multiplexing unit 207 multiplexes the downlink pilot channel and other channels in a time-frequency-multiplexing manner. Multiplexing unit 207 multiplexes the PDSCH addressed to each mobile station device 5 on the basis of the downlink physical resource block pair. Multiplexing unit 207 may multiplex the PDSCH using multiple pairs of downlink physical resource blocks, for one mobile station device 5. Multiplexing unit 207 multiplexes the PDCCH addressed to each mobile station device 5 using resources in the same downlink component carrier. Multiplexing unit 207 outputs the multiplexed signal to IFFT unit 209.

IFFT unit 209 performs Inverse Fast Fourier Transform on the signal multiplexed by multiplexing unit 207. IFFT unit 209 uses the OFDM scheme to modulate the signal having undergone Inverse Fast Fourier Transform. IFFT unit 209 outputs the signal obtained by the modulation to GI inserting unit 211.

GI inserting unit 211 attaches a guard interval to the signal modulated based on the OFDM scheme by IFFT unit 209 to thereby generate a baseband digital signal made up of OFDM symbols. As is well known, the guard interval is generated by replicating a part of the head or tail of the OFDM symbols to be transmitted. GI inserting unit 211 outputs the generated baseband digital signal to D/A unit 213.

D/A unit 213 converts the baseband digital signal that is input from GI inserting unit 211 into an analog signal. D/A unit 213 outputs the analog signal obtained by the conversion to transmission RF unit 215.

Transmission RF unit 215 generates in-phase and quadrature-phase components of the intermediate frequency from the analog signal which is input from D/A unit 213. Transmission RF unit 215 also removes unnecessary frequency components with respect to the intermediate frequency band. Then, transmission RF unit 215 (i) converts (up-converts) the intermediate-frequency signal to a high-frequency signal, (ii) removes unnecessary frequency components from the high-frequency signal, (iii) power-amplifies the high-frequency signal from which unnecessary frequency components are removed, and (iv) transmits the power-amplified signal through transmission antenna 111 to mobile station device 5.

<H. Configuration of Reception Processing Unit 101 of Base Station Device 3>

In the following, details of reception processing unit 101 of base station device 3 will be described. FIG. 3 is a schematic block diagram showing a configuration of reception processing unit 101 of base station device 3 according to an embodiment of the present invention. Referring to FIG. 3, reception processing unit 101 is configured to include a reception RF unit 301, an A/D (Analog/Digital converter) unit 303, a component carrier separation unit 305, and a plurality of uplink-component-carrier-basis reception processing units 307-1 to 307-M. In the following, uplink-component-carrier-basis reception processing units 307-1 to 307-M will collectively be referred to as "uplink-component-carrier-basis reception processing unit 307."

Uplink-component-carrier-basis reception processing units 307 includes a symbol timing detection unit 309, a GI removal unit 311, an FFT unit 313, a subcarrier de-mapping unit 315, a propagation path estimation unit 317, a PUSCH propagation path equalization unit 319, a PUCCH propagation path equalization unit 321, an IDFT unit 323, a data demodulation unit 325, a turbo decoding unit 327, and a physical uplink control channel detection unit 329. Since uplink-component-carrier-basis reception processing units 307 are configured and function similarly, one of them will exemplarily be described.

Reception RF unit 301 (i) appropriately amplifies a signal received by a reception antenna 109, (ii) converts (down-converts) the amplified signal to an intermediate-frequency signal, (iii) removes unnecessary frequency components from the intermediate-frequency signal, (iv) controls the amplification level of the signal from which unnecessary frequency components are removed, so that the signal level is maintained as appropriate, and (v) performs quadrature demodulation on the signal for which the amplification level is controlled, based on in-phase and quadrature-phase components of the received signal. Reception RF unit 301 outputs the quadrature-demodulated analog signal to A/D unit 303.

A/D unit 303 converts the analog signal, which is quadrature-demodulated by reception RF unit 301, to a digital signal. A/D unit 303 outputs the digital signal obtained by the conversion to component carrier separation unit 305.

Component carrier separation unit 305 separates the reception signal on the basis of the uplink component carrier in the uplink system bandwidth. Component carrier separation unit 305 outputs the separated reception signal to each uplink-component-carrier-basis reception processing unit 307.

Uplink-component-carrier-basis reception processing unit 307 demodulates and decodes the PUSCH and PUCCH in the uplink component carriers to detect information data and UCI.

Symbol timing detection unit 309 detects symbol timing based on the signal which is input from component carrier separation unit 305. Symbol timing detection unit 309 outputs a control signal indicating the detected symbol border timing to GI removal unit 311.

GI removal unit 311 removes, based on the control signal from symbol timing detection unit 309, a portion corresponding to the guard interval from the signal which is input from component carrier separation unit 305. GI removal unit 311 outputs the signal of the remaining portion (signal after removal) to FFT unit 313.

FFT unit 313 performs Fast Fourier Transform on the signal which is input from GI removal unit 311. FFT unit 313 performs demodulation based on the DFT-Spread-OFDM scheme, on the signal obtained by the Fast Fourier Transform. FFT unit 313 outputs the signal obtained by the demodulation to subcarrier de-mapping unit 315. The number of points of FFT unit 313 is equal to the number of points of an IFFT unit of mobile station device 5, which will be described later herein.

Subcarrier de-mapping unit 315 separates, based on the control signal which is input from control unit 105, the signal demodulated by FFT unit 313 into an uplink reference signal for the uplink pilot channel, a PUSCH signal, and a PUCCH signal. Subcarrier de-mapping unit 315 outputs the separated uplink reference signal to propagation path estimation unit 317. Subcarrier de-mapping unit 315 outputs the separated PUSCH signal to PUSCH propagation path equalization unit 319. Subcarrier de-mapping unit 315 outputs the separated PUCCH signal to PUCCH propagation path equalization unit 321.

Propagation path estimation unit 317 estimates fluctuation on the propagation path using the uplink reference signal separated by subcarrier de-mapping unit 315 and a known signal. Propagation path estimation unit 317 outputs the estimated propagation path estimated value to PUSCH propagation path equalization unit 319 and PUCCH propagation path equalization unit 321.

PUSCH propagation path equalization unit 319 equalizes the amplitude and phase of the PUSCH signal separated by subcarrier de-mapping unit 315, based on the propagation path estimated value which is input from propagation path estimation unit 317. Here, "equalization" refers to a process of returning the signal that has experienced propagation path fluctuation during radio communication to the original state. PUSCH propagation path equalization unit 319 outputs the adjusted signal to IDFT unit 323.

IDFT unit 323 performs Inverse Discrete Fourier Transform on the signal which is input from PUSCH propagation path equalization unit 319. IDFT unit 323 outputs the signal obtained by the Inverse Discrete Fourier Transform to data demodulation unit 325.

Data demodulation unit 325 demodulates the PUSCH signal which has been subjected to transform by IDFT unit 323. Data demodulation unit 325 outputs the demodulated PUSCH signal to turbo decoding unit 327. The demodulation here conforms to the modulation scheme used by the data modulation unit of mobile station device 5. The modulation scheme for the demodulation is input from control unit 105.

Turbo decoding unit 327 decodes information data from the demodulated PUSCH signal which is input from data demodulation unit 325. The code rate is input from control unit 105.

PUCCH propagation path equalization unit 321 equalizes the amplitude and phase of the PUCCH signal separated by subcarrier de-mapping unit 315, based on the propagation path estimated value which is input from propagation path estimation unit 317. PUCCH propagation path equalization unit 321 outputs the equalized signal to physical uplink control channel detection unit 329.

Physical uplink control channel detection unit 329 demodulates and decodes the signal which is input from PUCCH propagation path equalization unit 321, and detects control information. Physical uplink control channel detection unit 329 performs a process of separating a signal which is code-multiplexed in the frequency domain and/or the frequency domain. Physical uplink control channel detection unit 329 detects ACK/NACK which is made where carrier aggregation is not used, SR, and CQI, from the signal of the first PUCCH which is code-multiplexed in the frequency domain and/or the time domain, using the code used on the transmitting side. Physical uplink control channel detection unit 329 also detects ACK/NACK which is made where carrier aggregation is used and SR, from the signal of the second PUCCH which is code-multiplexed in the time domain, using the code used on the transmitting side.

Specifically, physical uplink control channel detection unit 329 generates a code-multiplied signal by multiplying the subcarrier-basis PUCCH signal by the code, in the detection process using the code in the frequency domain (namely the process of separating code-multiplexed signal in the frequency domain). Specifically, physical uplink control channel detection unit 329 generates a code-multiplied signal by multiplying the SC-FDMA-symbol-basis PUCCH signal by the code, in the detection process using the code in the time domain (namely the process of separating code-multiplexed signal in the time domain). Based on a control signal from control unit 105, physical uplink control channel detection unit 329 sets the detection process for the PUCCH (first PUCCH, second PUCCH) signals.

Physical uplink control channel detection unit 329 decodes the signal of the second PUCCH, supposing that two different types of UCIs, namely ACK/NACK which is made where carrier aggregation is used and SR, are included. Physical uplink control channel detection unit 329 also decodes the signal of the second PUCCH, supposing that one type of UCI, namely ACK/NACK is included where carrier aggregation is used. Physical uplink control channel detection unit 329 decodes the signal of the second PUCCH to which block coding is applied to (i) detect ACK/NACK which is made where carrier aggregation is used and SR or (ii) detect only ACK/NACK which is made where carrier aggregation is used. Control unit 105 gives an instruction indicating which case is supposed to decode the signal of the second PUCCH by physical uplink control channel detection unit 329.

Control unit 105 controls physical uplink control channel detection unit 329 so that it decodes the signal of the second PUCCH supposing that only one type of UCI, namely ACK/NACK is included where carrier aggregation is used, in the case where only a resource of the second PUCCH is allocated in a certain uplink subframe and a resource of the first PUCCH for SR is not allocated in the uplink subframe. Control unit 105 also controls physical uplink control channel detection unit 329 so that it decodes the signal of the second PUCCH supposing that two different types of UCI, namely ACK/NACK which is made where carrier aggregation is used and SR, are included, in the case where a resource of the second PUCCH is allocated in a certain uplink subframe and a resource of the first PUCCH for SR is also allocated in the uplink subframe.

Based on the control information (DCI) transmitted on the PDCCH from base station device 3 to mobile station device 5 as well as the control information transmitted on the PDSCH, control unit 105 controls subcarrier de-mapping unit 315, data demodulation unit 325, turbo decoding unit 327, propagation path estimation unit 317, and physical uplink control channel detection unit 329. Based on the control information transmitted from base station device 3 to mobile station device 5, control unit 105 knows the resources (uplink subframe, uplink physical resource block, code of the frequency domain, code of the time domain) of which the PUSCH and the PUCCH transmitted from each mobile station device are configured.

<I. Overall Configuration of Mobile Station Device 5>

Figure 4:
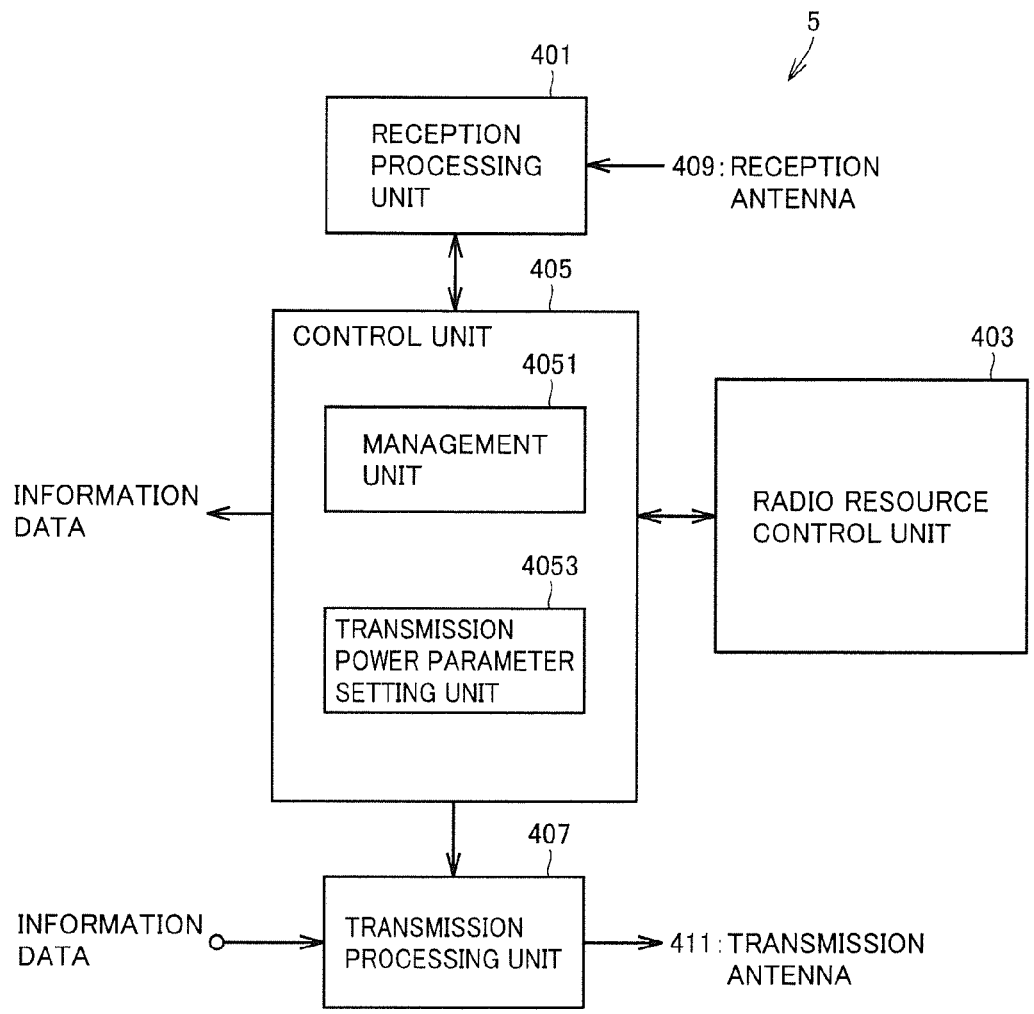
FIG. 4 is a schematic block diagram showing a configuration of a mobile station device according to an embodiment of the present invention.
Figure 5:
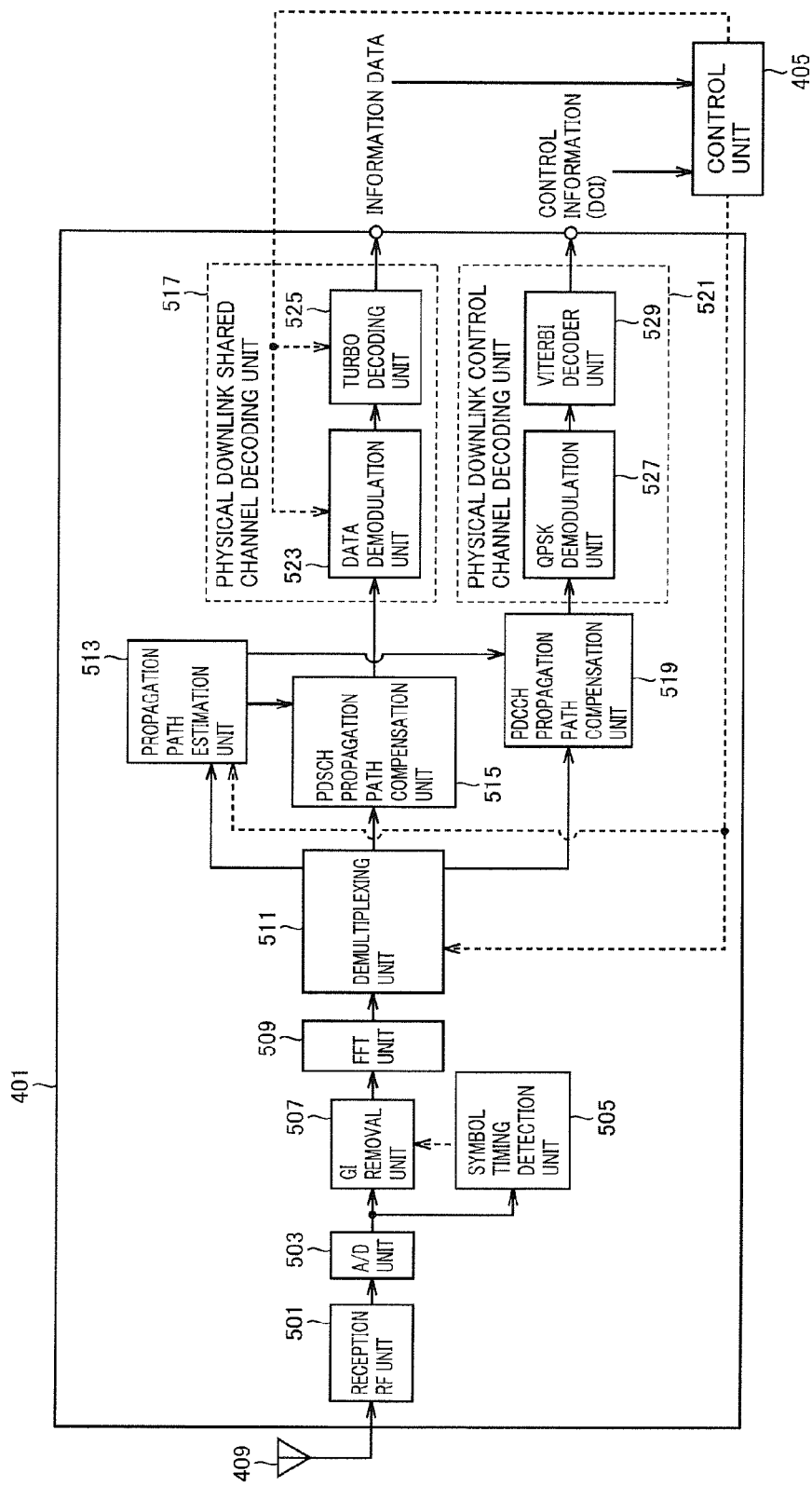
FIG. 5 is a schematic block diagram showing a configuration of a reception processing unit of the mobile station device according to an embodiment of the present invention.

In the following, FIGS. 4, 5, and 6 will be used to describe a configuration of mobile station device 5. FIG. 4 is a schematic block diagram showing the configuration of mobile station device 5 according to an embodiment of the present invention. Referring to FIG. 4, mobile station device 5 is configured to include a reception processing unit 401, a radio resource control unit 403, a control unit 405, and a transmission processing unit 407. Control unit 405 includes a management unit 4051 and a transmission power parameter setting unit 4053.

Reception processing unit 401 receives signals from base station device 3. Following an instruction from control unit 405, reception processing unit 401 demodulates and decodes the received signals. In the case where reception processing unit 401 detects a PDCCH signal addressed to the mobile station device thereof, reception processing unit 401 outputs to control unit 405 DCI obtained by decoding the PDCCH signal. Based on an instruction from control unit 405 after the DCI included in the PDCCH is output to control unit 405, reception processing unit 401 outputs to a higher layer through control unit 405, information data obtained by decoding a PDSCH addressed to the mobile station device thereof. A downlink assignment in the DCI included in the PDCCH includes information indicating allocation of a resource of the PDSCH.

Reception processing unit 401 also outputs to control unit 405 control information generated by radio resource control unit 103 of base station device 3 and obtained by decoding the PDSCH. Reception processing unit 401 outputs the generated control information through control unit 405 to radio resource control unit 403 of the mobile station device thereof. For example, the control information generated by radio resource control unit 103 of base station device 3 includes information indicating PUCCH resource allocation and information indicating a part of parameter values relevant to transmission power for the PUCCH.

Reception processing unit 401 outputs a cyclic redundancy check (CRC) code included in the PDSCH to control unit 405. Transmission processing unit 107 of base station device 3 generates a CRC code from information data and transmits the information data and the generated CRC code on the PDSCH, which, however, has not been explained above in the description of base station device 3.

The CRC code is used for determining whether there is any error in the data included in the PDSCH. If information generated from the data using a predetermined generator polynominal is the same as the CRC code, it is determined that the data is free of error. If information generated from the data using a predetermined generator polynominal is not the same as the CRC code, it is determined that the data is in error. Details of reception processing unit 401 will be described later herein.

Control unit 405 includes management unit 4051 and transmission power parameter setting unit 4053. Control unit 405 (i) confirms data transmitted from base station device 3 using the PDSCH and input from reception processing unit 401, (ii) outputs to a higher layer information data in the aforementioned data, and (iii) controls reception processing unit 401 and transmission processing unit 407 based on control information generated by radio resource control unit 103 of base station device 3, in the confirmed data.

Control unit 405 controls reception processing unit 401 and transmission processing unit 407 based on an instruction from radio resource control unit 403. For example, control unit 405 controls transmission processing unit 407 so that UCI is transmitted on the PUCCH of a resource specified by radio resource control unit 403. Control unit 405 also controls reception processing unit 401 and transmission processing unit 407 based on DCI which is transmitted on the PDCCH from base station device 3 and input from reception processing unit 401. Specifically, control unit 405 controls reception processing unit 401 based on a detected downlink assignment and controls transmission processing unit 407 based on a detected uplink grant.

Control unit 405 also compares data generated using a predetermined generator polynominal and input from reception processing unit 401 with the CRC code which is input from reception processing unit 401, and determines whether or not the data is in error. Based on the result of the determination, control unit 405 generates ACK/NACK. Based on an instruction from radio resource control unit 403, control unit 405 generates SR and CQI. Actually, management unit 4051 of control unit 405 controls generation of ACK/NACK which is made where carrier aggregation is not used, and controls generation of ACK/NACK which is made where carrier aggregation is used, SR, and CQI.

Management unit 4051 manages generation of UCI in the mobile station device thereof. For example, in the case where the data and the CRC code are input from reception processing unit 401 to control unit 405, management unit 4051 generates ACK/NACK. In the case where the information generated from the data using a predetermined generator polynominal is the same as the CRC code, ACK is indicated by ACK/NACK, and NACK is indicated by ACK/NACK in the case where the generated information is not the same as the CRC code.

In the case where communication without using carrier aggregation is done by the mobile station device of management unit 4051, management unit 4051 generates only one ACK/NACK for the PDSCH of a given downlink subframe. In the case where communication using carrier aggregation is done by the mobile station device of management unit 4051, management unit 4051 generates multiple ACKs/NACKs for multiple PDSCHs of a given downlink subframe. For example, management unit 4051 generates SR at the timing corresponding to an uplink subframe where a PUCCH resource for the SR is allocated in advance by base station device 3. Here, "timing corresponding to an uplink subframe" means the timing earlier than the uplink subframe by at least a time of process delay, so that the signal can be transmitted by this uplink subframe.

In the case where radio resource control unit 403 determines that there is a lack of uplink resource and a control signal requesting generation of the SR indicating a request for resource allocation is input from radio resource control unit 403, management unit 4051 generates the SR (also referred to as "Positive SR") indicating a request for resource allocation. In the case where the control signal requesting generation of the SR indicating a request for resource allocation is not input from radio resource control unit 403, management unit 4051 generates an SR (also referred to as "Negative SR") indicating the fact that no request for resource allocation is made. Radio resource control unit 403 determines that there is a lack of uplink resource in the case for example where the amount of data stored in a transmission buffer exceeds a predetermined threshold value. For example, management unit 4051 generates the CQI at the timing corresponding to an uplink subframe where a PUCCH resource for the CQI is allocated in advance by base station device 3.

Transmission power parameter setting unit 4053 sets parameter values relevant to transmission power for the PUCCH, PUSCH, and uplink pilot channel, for example. The value of transmission power set by transmission power parameter setting unit 4053 is output by control unit 405 to transmission processing unit 407. On the uplink pilot channel made up of a resource in the same uplink physical resource block as the PUCCH, transmission power control which is the same as that for the PUCCH is performed. On the uplink pilot channel made up of a resource in the same uplink physical resource block as the PUSCH, transmission power control which is the same as that for the PUSCH is performed.

For the PUSCH, transmission power parameter setting unit 4053 sets values of parameters such as a parameter based on the number of uplink physical resource blocks allocated to the PUSCH, cell-specific and mobile-station-device-specific parameters of which it is informed by base station device 3 in advance, a parameter based on a modulation scheme used for the PUSCH, a parameter based on an estimated path loss value, and a parameter based on a transmission power control command of which it is informed by base station device 3.

For the PUCCH, transmission power parameter setting unit 4053 sets values of parameters such as a parameter based on a signal configuration of the PUCCH, cell-specific and mobile-station-device-specific parameters of which it is informed in advance by base station device 3, a parameter based on an estimated path loss value, and a parameter based on a transmission power control command of which it is informed. In particular, transmission power parameter setting unit 4053 sets, for the second PUCCH, a value of a parameter based on the signal configuration of the PUCCH, in accordance with the number of information bits of ACK/NACK and SR transmitted on the second PUCCH.

As parameters relevant to transmission power, the cell-specific and mobile-station-device-specific parameters are conveyed on the PDSCH from base station device 3, and the transmission power control command is conveyed on the PDCCH from base station device 3. The transmission power control command for the PUSCH is included in an uplink grant. The transmission power control command for the PUCCH is included in a downlink assignment.

Control unit 405 controls the signal configuration of the PUCCH depending on the type of UCI generated by management unit 4051. Control unit 405 also controls the signal configuration of the PUCCH used by transmission power parameter setting unit 4053. For example, in the case where management unit 4051 generates ACK/NACK which is made where carrier aggregation is used and SR, control unit 405 controls transmission power parameter setting unit 4053 so that it sets a parameter value based on the signal configuration of the second PUCCH. Control unit 405 uses, for transmission power parameter setting unit 4053, the number of information bits of ACK/NACK which is made where carrier aggregation is used and the number of information bits of SR, which are generated by the management unit 4051.

The various parameters relevant to the transmission power of which the mobile station device is informed by base station device 3 are stored as appropriate by radio resource control unit 403, and the stored values are input to transmission power parameter setting unit 4053.

Radio resource control unit 403 stores and holds control information generated by radio resource control unit 103 of base station device 3 and conveyed from base station device 3, and controls reception processing unit 401 and transmission processing unit 407 through control unit 405. Specifically, radio resource control unit 403 has a function of a memory holding various parameters. For example, radio resource control unit 403 holds control information relevant to PUCCH resource allocation, and outputs a control signal to control unit 405 so that transmission processing unit 407 transmits the PUCCH signal using the held resource. Radio resource control unit 403 also holds parameters relevant to PUSCH and PUCCH transmission power, and outputs a control signal to control unit 405 so that transmission power parameter setting unit 4053 uses parameters conveyed from base station device 3.

Transmission processing unit 407 follows an instruction from control unit 405 to encode information data and UCI. Transmission processing unit 407 follows an instruction from control unit 405 to transmit modulated signals on PUSCH and PUCCH resources to base station device 3 through transmission antenna 411. Transmission processing unit 407 also follows an instruction from control unit 405 to set PUSCH and PUCCH transmission power. For example, transmission processing unit 407 (i) applies common coding to information bits of ACK/NACK which is made where carrier aggregation is used and SR, to generate signals, (ii) sets transmission power of a value which is input from transmission power parameter setting unit 4053, and (iii) transmits a signal on a resource of the second PUCCH through transmission antenna 411. Details of transmission processing unit 407 will be described later herein.

<J. Reception Processing Unit 401 of Mobile Station Device 5>

In the following, details of reception processing unit 401 of mobile station device 5 will be described. FIG. 5 is a schematic block diagram showing a configuration of reception processing unit 401 of mobile station device 5. Referring to FIG. 5, reception processing unit 401 is configured to include a reception RF unit 501, an A/D unit 503, a symbol timing detection unit 505, a GI removal unit 507, an FFT unit 509, a de-multiplexing unit 511, a propagation path estimation unit 513, a PDSCH propagation path compensation unit 515, a physical downlink shared channel decoding unit 517, a PDCCH propagation path compensation unit 519, and a physical downlink control channel decoding unit 521. Physical downlink shared channel decoding unit 517 includes a data demodulation unit 523 and a turbo decoding unit 525. Physical downlink control channel decoding unit 521 includes a QPSK demodulation unit 527 and a Viterbi decoder unit 529.

Reception RF unit 501 (i) appropriately amplifies a signal received by reception antenna 409, (ii) converts (down-converts) the amplified signal to an intermediate-frequency signal, (iii) removes unnecessary frequency components from the intermediate-frequency signal, (iv) controls the amplification level of the signal from which unnecessary frequency components are removed, so that an appropriate signal level is maintained, and (v) performs quadrature demodulation on the signal with its amplification level controlled, based on the in-phase and quadrature-phase components of the received signal. Reception RF unit 501 outputs the quadrature-demodulated analog signal to A/D unit 503.

A/D unit 503 converts the analog signal that has been quadrature-demodulated by reception RF unit 501 to a digital signal. A/D unit 503 outputs the digital signal obtained by conversion to symbol timing detection unit 505 and GI removal unit 507.

Symbol timing detection unit 505 detects symbol timing based on the digital signal obtained by conversion by A/D unit 503. Symbol timing detection unit 505 outputs a control signal indicating the detected timing of symbol border to GI removal unit 507.

GI removal unit 507 removes, based on the control signal from symbol timing detection unit 505, a portion corresponding to a guard interval from the digital signal which is output from A/D unit 503. GI removal unit 507 outputs the signal of the remaining portion (signal after removal) to FFT unit 509.

FFT unit 509 performs Fast Fourier Transform on the signal which is input from GI removal unit 507. FFT unit 509 performs demodulation based on the OFDM scheme. FFT unit 313 outputs the signal obtained by the demodulation to de-multiplexing unit 511.

De-multiplexing unit 511 separates the signal demodulated by FFT unit 509 to a PDCCH signal and a PDSCH signal, based on the control signal which is input from control unit 405. De-multiplexing unit 511 outputs the separated PDSCH signal to PDSCH propagation path compensation unit 515. De-multiplexing unit 511 outputs the separated PDCCH signal to PDCCH propagation path compensation unit 519. De-multiplexing unit 511 separates a downlink resource element on which a downlink pilot channel is mapped. De-multiplexing unit 511 outputs a downlink reference signal of the downlink pilot channel obtained by the separation to propagation path estimation unit 513. De-multiplexing unit 511 outputs a signal of a PDCCH CC to PDCCH propagation path compensation unit 519. De-multiplexing unit 511 outputs a signal of a PDSCH CC to PDSCH propagation path compensation unit 515.

Propagation path estimation unit 513 estimates fluctuation on the propagation path using the downlink reference signal of the downlink pilot channel separated by de-multiplexing unit 511 and a known signal. Propagation path estimation unit 513 outputs a propagation path compensating value for adjusting amplitude and phase to PDSCH propagation path compensation unit 515 and PDCCH propagation path compensation unit 519, to compensate for the fluctuation on the propagation path, based on the estimation.

PDSCH propagation path compensation unit 515 adjusts the amplitude and phase of the PDSCH signal de-multiplexed by de-multiplexing unit 511 in accordance with the propagation path compensation value which is input from propagation path estimation unit 513. PDSCH propagation path compensation unit 515 outputs the signal for which propagation path is adjusted, to data demodulation unit 523 of physical downlink shared channel decoding unit 517.

Physical downlink shared channel decoding unit 517 demodulates and decodes the PDSCH in accordance with an instruction from control unit 405, and detects information data. Data demodulation unit 523 demodulates the PDSCH signal which is input from propagation path compensation unit 515. Data demodulation unit 523 outputs the demodulated PDSCH signal to turbo decoding unit 525. The demodulation is done based on the modulation scheme used by data modulation unit 221 of base station device 3.

Turbo decoding unit 525 decodes information data from the demodulated PDSCH signal which is input from data demodulation unit 523. Turbo decoding unit 525 outputs the decoded information data to a higher layer through control unit 405. Control information and the like generated by radio resource control unit 103 of base station device 3 and transmitted on the PDSCH are also output to control unit 405, and further output as well to radio resource control unit 403 through control unit 405. The CRC code included in the PDSCH is also output to control unit 405.

PDCCH propagation path compensation unit 519 adjusts the amplitude and phase of the PDCCH signal de-multiplexed by de-multiplexing unit 511 in accordance with the propagation path compensation value which is input from propagation path estimation unit 513. PDCCH propagation path compensation unit 519 outputs the adjusted signal to QPSK demodulation unit 527 of physical downlink control channel decoding unit 521.

Physical downlink control channel decoding unit 521 demodulates and decodes the signal which is input from PDCCH propagation path compensation unit 519 in the following manner, to detect control data. QPSK demodulation unit 527 performs QPSK demodulation on the PDCCH signal. QPSK demodulation unit 527 outputs the QPSK-demodulated signal to Viterbi decoder unit 529.

Viterbi decoder unit 529 decodes the signal demodulated by QPSK demodulation unit 527. Viterbi decoder unit 529 outputs the decoded DCI to control unit 405. Here, the signal is represented on the bit basis. Viterbi decoder unit 529 also performs rate de-matching on the input bits, for adjusting the number of bits to be subjected to the Viterbi decoding process.

Control unit 405 determines whether or not the DCI which is input from Viterbi decoder unit 529 is error-free and determines whether or not the DCI is addressed to the mobile station device thereof. In the case where control unit 405 determines that the DCI is error-free and addressed to the mobile station device thereof, control unit 405 controls, based on the DCI, de-multiplexing unit 511, data demodulation unit 523, turbo decoding unit 525 and transmission processing unit 407. For example, if the DCI is a downlink assignment, control unit 405 controls reception processing unit 401 so that the PDSCH signal is decoded by the downlink component carrier where the resource is allocated. The PDCCH also includes the CRC code, like the PDSCH.

Control unit 405 uses the CRC code to determine whether or not the DCI of the PDCCH is in error.

<K. Transmission Processing Unit 407 of Mobile Station Device 5>

Figure 6:
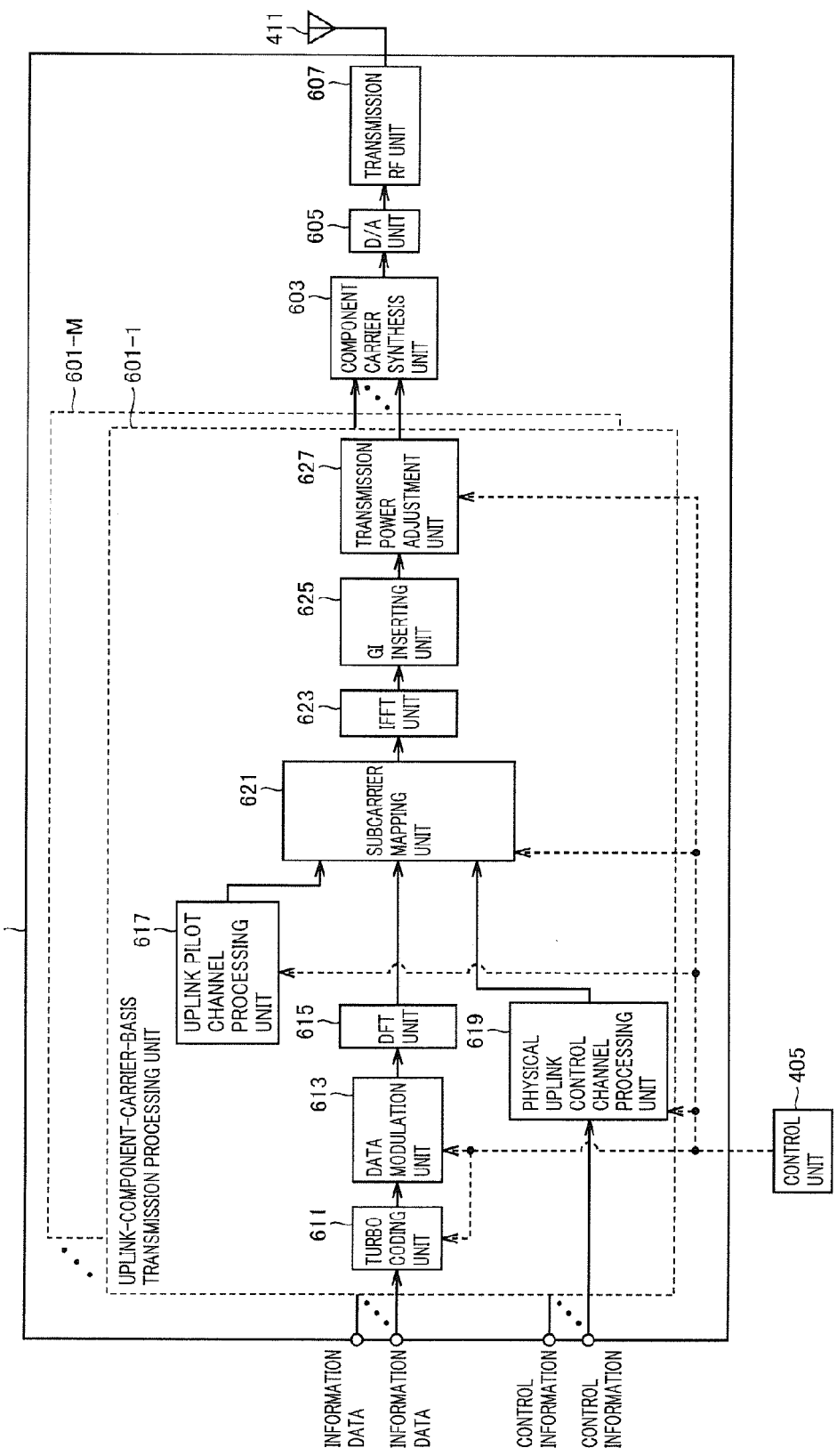
FIG. 6 is a schematic block diagram showing a configuration of a transmission processing unit of the mobile station device according to an embodiment of the present invention.

FIG. 6 is a schematic block diagram showing a configuration of transmission processing unit 407 of mobile station device 5 according to an embodiment of the present invention. Referring to FIG. 6, transmission processing unit 407 is configured to include a plurality of uplink-component-carrier-basis transmission processing units 601-1 to 601-M, a component carrier synthesis unit 603, a D/A unit 605, a transmission RF unit 607, and a transmission antenna 411. In the following, uplink-component-carrier-basis transmission processing units 601-1 to 601-M will collectively be referred to as "uplink-component-carrier-basis transmission processing unit 601."

Uplink-component-carrier-basis transmission processing unit 601 includes a turbo coding unit 611, a data modulation unit 613, a DFT unit 615, an uplink pilot channel processing unit 617, a physical uplink control channel processing unit 619, a subcarrier mapping unit 621, an IFFT unit 623, a GI inserting unit 625, and a transmission power adjustment unit 627. Mobile station device 5 has uplink-component-carrier-basis transmission processing units 601 for the corresponding number of respective uplink component carriers. Since uplink-component-carrier-basis transmission processing units 601 are configured and function similarly, one of them will exemplarily be described.

Uplink-component-carrier-basis transmission processing units 601 (i) encodes and modulates information data and UCI, (ii) generates signals to be transmitted on the PUSCH and PUCCH in the uplink component carrier, and (iii) adjusts PUSCH and PUCCH transmission power.

Turbo coding unit 611 performs turbo coding on the input information data with a code rate which is specified by control unit 405, to enhance the data error resilience. Turbo coding unit 611 outputs the turbo-coded information data to data modulation unit 613.

Data modulation unit 613 modulates the coded data coded by turbo coding unit 611 based on a modulation scheme (modulation scheme such as QPSK, 16QAM or 64QAM) specified by control unit 405, and thereby generates a signal sequence of modulation symbols. Data modulation unit 613 outputs the generated signal sequence of modulation symbols to DFT unit 615.

DFT unit 615 performs Discrete Fourier Transform on the signal which is output from data modulation unit 613. DFT unit 615 outputs the signal having undergone Discrete Fourier Transform to subcarrier mapping unit 621.

Physical uplink control channel processing unit 619 performs baseband signal processing for transmitting the UCI which is input from control unit 405. The UCI which is input to physical uplink control channel processing unit 619 includes ACK/NACK where carrier aggregation is not used, ACK/NACK which is made where carrier aggregation is used, SR and CQI. Physical uplink control channel processing unit 619 performs baseband signal processing. Physical uplink control channel processing unit 619 outputs the signal generated through the baseband signal processing to subcarrier mapping unit 621. Physical uplink control channel processing unit 619 performs baseband signal processing in different manners respectively on a signal for the first PUCCH and a signal for the second PUCCH.

Physical uplink control channel processing unit 619 encodes UCI information bits to generate a signal. For example, physical uplink control channel processing unit 619 applies block coding to information bits of ACK/NACK which is made where carrier aggregation is used and SR, to generate a signal to be transmitted on the second PUCCH. For example, block coding is performed using a Reed-Muller code. Physical uplink control channel processing unit 619 also applies similar block coding as well in the case where a signal is generated from information bits of only ACK/NACK which is made where carrier aggregation is used. For example, physical uplink control channel processing unit 619 applies repetition coding to information bits of ACK/NACK where carrier aggregation is not used, to generate a signal to be transmitted on the first PUCCH.

Physical uplink control channel processing unit 619 performs baseband signal processing based on the DFT-Spread-OFDM scheme, on a signal of the second PUCCH. Physical uplink control channel processing unit 619, however, does not perform baseband signal processing based on the DFT-Spread-OFDM scheme, on a signal of the first PUCCH. Here, "baseband signal processing based on the DFT-Spread-OFDM scheme" means that a UCI signal is subjected to DFT processing and converted to a signal of the frequency domain, and thereafter a signal is mapped to a given subcarrier to perform IFFT processing. In the case where the baseband signal processing based on the DFT-Spread-OFDM scheme is not performed, the UCI signal is directly mapped to a given subcarrier and IFFT processing is performed.

Physical uplink control channel processing unit 619 generates a signal for the first PUCCH in the case where a signal is generated from information bits of only ACK/NACK where carrier aggregation is not used, the case where a signal is generated from information bits of only SR, or the case where a signal is generated from information bits of only CQI, for example. Physical uplink control channel processing unit 619 generates a signal for the second PUCCH in the case where a signal is generated from information bits of only ACK/NACK which is made where carrier aggregation is used, or the case where a signal is generated from information bits of ACK/NACK which is made where carrier aggregation is used and SR, for example.

Physical uplink control channel processing unit 619 also performs signal processing relevant to code multiplexing in the frequency domain and/or code multiplexing in the time domain, on the signal generated from UCI. In order to implement code multiplexing in the frequency domain, physical uplink control channel processing unit 619 multiplies a signal for the first PUCCH generated from information bits of ACK/NACK which is made where carrier aggregation is not used, information bits of SR, or information bits of CQI, by a code specified by control unit 405.

In order to implement code multiplexing in the time domain, physical uplink control channel processing unit 619 multiplies a signal for the first PUCCH generated from information bits of ACK/NACK which is made where carrier aggregation is not used or information bits of SR, by a code specified by control unit 405. In order to implement code multiplexing in the time domain, physical uplink control channel processing unit 619 multiplies a signal for the second PUCCH generated from information bits of ACK/NACK where carrier aggregation is used, or information bits of ACK/NACK which is made where carrier aggregation is used and SR, by a code specified by control unit 405.

Uplink pilot channel processing unit 617 generates an uplink reference signal which is a known signal in base station device 3, based on an instruction from control unit 405. Uplink pilot channel processing unit 617 outputs the generated uplink reference signal to subcarrier mapping unit 621, Subcarrier mapping unit 621 maps, to a subcarrier, the signal which is input from uplink pilot channel processing unit 617, the signal which is input from DFT unit 615, and the signal which is input from physical uplink control channel processing unit 619, based on an instruction from control unit 405, and outputs the result to IFFT unit 623.

IFFT unit 623 performs Inverse Fast Fourier Transform on the signal which is output from subcarrier mapping unit 621. IFFT unit 623 outputs the signal obtained by the Inverse Fast Fourier Transform to GI inserting unit 625. Here, the number of points of IFFT unit 623 is larger than that of DFT unit 615. Mobile station device 5 performs DFT-Spread-OFDM modulation on the signal transmitted on the PUSCH, by using DFT unit 615, subcarrier mapping unit 621, and IFFT unit 623. Mobile station device 5 also performs DFT-Spread-OFDM modulation on the signal transmitted on the second PUCCH, by using physical uplink control channel processing unit 619, subcarrier mapping unit 621, and IFFT unit 623.

GI inserting unit 625 attaches a guard interval to the signal which is input from IFFT unit 623. GI inserting unit 625 outputs the signal to which the guard interval is attached, to transmission power adjustment unit 627.

Transmission power adjustment unit 627 adjusts the transmission power for the signal which is input from GI inserting unit 625, based on a control signal from control unit 405. Transmission power adjustment unit 627 outputs the signal for which the transmission power is adjusted, to component carrier synthesis unit 603. Transmission power adjustment unit 627 controls the average transmission power of the PUSCH, PUCCH, and uplink pilot channel, for each uplink subframe. By processing of transmission power adjustment unit 627, transmission power for the signal of the second PUCCH is controlled based on a parameter whose value is set in accordance with the number of information bits of ACK/NACK and SR.

Component carrier synthesis unit 603 synthesizes a signal for each uplink component carrier that is input from each uplink-component-carrier-basis transmission processing unit 601. Component carrier synthesis unit 603 outputs the synthesized signal to D/A unit 605.

D/A unit 605 converts the baseband digital signal which is input from component carrier synthesis unit 603 to an analog signal. D/A unit 605 outputs the analog signal obtained by this conversion to transmission RF unit 607.

Transmission RF unit 607 generates, from the analog signal which is input from D/A unit 605, in-phase and quadrature-phase components of the intermediate frequency. Transmission RF unit 607 removes unnecessary frequency components with respect to the intermediate frequency band. Then, transmission RF unit 607 (i) converts (up-converts) the intermediate-frequency signal to a high-frequency signal, (ii) removes unnecessary frequency components from the high-frequency signal, (iii) power-amplifies the high-frequency signal from which unnecessary frequency components are removed, and (iv) transmits the power-amplified signal through transmission antenna 411 to base station device 3.

<L. Setting of Parameter Relevant to Transmission Power>

A description will be given of how a value of a parameter relevant to transmission power for the second PUCCH is set by transmission power parameter setting unit 4053. When ACK/NACK which is made where carrier aggregation is used and SR are generated by management unit 4051, transmission power parameter setting unit 4053 sets a value of the parameter based on the signal configuration of the PUCCH, in accordance with the number of information bits of ACK/NACK which is made where carrier aggregation is used and SR which are made.

FIG. 7 is a diagram illustrating a correspondence between the number of information bits of ACK/NACK and SR, and the value of a parameter relevant to transmission power. Here, "ACK/NACK" is ACK/NACK which is made where carrier aggregation is used. "Parameter relevant to transmission power" is a parameter based on the signal configuration of the PUCCH. The value of the parameter relevant to transmission power is expressed in decibel [dB].

Referring to FIG. 7, the following description will use ten different numbers of information bits of ACK/NACK and SR (N1, N2, N3, N4, N5, N6, N7, N8, N9, N10) and ten different values of the parameter relevant to transmission power (X1, X2, X3, X4, X5, X6, X7, X8, X9, X10). The illustrated case (the case shown in FIG. 7), however, is not given for the sake of limitation.

The numbers of information bits of ACK/NACK and SR have a relation in magnitude expressed by N1<N2<N3<N4<N5<N6<N7<N8<N9<N10. The values of the parameter relevant to transmission power have a relation in magnitude expressed by X1<X2<X3<X4<X5<X6<X7<X8<X9<X10.

When the number of information bits of ACK/NACK and SR is N1, transmission power parameter setting unit 4053 sets the value of the parameter relevant to transmission power to X1. When the number of information bits of ACK/NACK and SR is N2, transmission power parameter setting unit 4053 sets the value of the parameter relevant to transmission power to X2. When the number of information bits of ACK/NACK and SR is N3, transmission power parameter setting unit 4053 sets the value of the parameter relevant to transmission power to X3. When the number of information bits of ACK/NACK and SR is N4, transmission power parameter setting unit 4053 sets the value of the parameter relevant to transmission power to X4. When the number of information bits of ACK/NACK and SR is N5, transmission power parameter setting unit 4053 sets the value of the parameter relevant to transmission power to X5. When the number of information bits of ACK/NACK and SR is N6, transmission power parameter setting unit 4053 sets the value of the parameter relevant to transmission power to X6. When the number of information bits of ACK/NACK and SR is N7, transmission power parameter setting unit 4053 sets the value of the parameter relevant to transmission power to X7. When the number of information bits of ACK/NACK and SR is N8, transmission power parameter setting unit 4053 sets the value of the parameter relevant to transmission power to X8. When the number of information bits of ACK/NACK and SR is N9, transmission power parameter setting unit 4053 sets the value of the parameter relevant to transmission power to X9. When the number of information bits of ACK/NACK and SR is N10, transmission power parameter setting unit 4053 sets the value of the parameter relevant to transmission power to X10.

While the above description illustrates that the correspondence between the number of information bits of ACK/NACK and SR and the value of the parameter relevant to transmission power is managed by the table as shown in FIG. 7, it may also be managed by means of a mathematical expression. Specifically, transmission power parameter setting unit 4053 may use the mathematical expression defined in such a manner that the number of information bits of ACK/NACK and SR is an input value of the mathematical expression and the value of the parameter relevant to transmission power is an output value of the mathematical expression.

When management unit 4051 generates only ACK/NACK which is made where carrier aggregation is used, transmission power parameter setting unit 4053 sets the value of the parameter based on the signal configuration of the PUCCH in accordance with the number of information bits of ACK/NACK which is made where carrier aggregation is used. Namely, when management unit 4051 generates only ACK/NACK which is made where carrier aggregation is used, transmission power parameter setting unit 4053 identifies the number of information bits of SR as zero bit, and sets the value of the parameter relevant to transmission power using the correspondence between the number of information bits of ACK/NACK and SR and the value of the parameter relevant to transmission power shown in FIG. 7.

The number of information bits of ACK/NACK which is made where carrier aggregation is used depends on downlink component carriers used for carrier aggregation (to be accurate, the number of PDSCH CCs). For example, it is supposed that three PDSCH CCs are configured for mobile station device 5. When mobile station device 5 detects a PDCCH including at least one downlink assignment addressed to itself, mobile station device 5 generates ACK/NACK of 3 bits in total in response to respective PDSCHs of the PDSCH CCs. Each bit of ACK/NACK corresponds to the PDSCH of each PDSCH CC.

In response to a PDSCH of a PDSCH CC for which resource allocation is indicated by a detected PDCCH, mobile station device 5 provides ACK or NACK indicated by a corresponding ACK/NACK bit, depending on the result of decoding. In response to a PDSCH of a PDSCH CC for which resource allocation is not indicated since the corresponding PDCCH is not detected, mobile station device 5 provides NACK indicated by a corresponding ACK/NACK bit. The fact that the corresponding PDCCH failed to be detected (referred to as "DTX") may be indicated separately from ACK or NACK. In this case, the number of bits of ACK/NACK is increased. In the case where three PDSCH CCs are configured for mobile station device 5 and ACK, NACK, and DTX are indicated as separate pieces of information by ACK/NACK, the number of bits of ACK/NACK is larger than three. Thus, in the case where DTX is also provided, the number of bits depending on the number of states of ACK, NACK, and DTX is used by power parameter setting unit 4053 in setting the value of the parameter relevant to transmission power.

In the case where MIMO (Multi-Input Multi-Output) is applied to the PDSCH and one PDSCH transmits multiple data sequences, the number of bits of ACK/NACK increases. For example, when MIMO is used to transmit two data sequences on one PDSCH, the number of bits of ACK/NACK is twice as large as that in the case where one data sequence is transmitted on the PDSCH. In the case where three PDSCH CCs are configured for mobile station device 5 and two data sequences are transmitted on the PDSCH of each PDSCH CC, the number of bits of ACK/NACK is six.

Setting may also be done so that MIMO is applied to PDSCHs of a part of PDSCH CCs. For example, in the case where three PDSCH CCs are configured for mobile station device 5 and setting is done so that MIMO is applied to the PDSCHs of two PDSCH CCs only, the number of bits of ACK/NACK is five.

Thus, depending on whether MIMO is applied to the PDSCH, the number of bits of ACK/NACK is set, and the set number of bits is used by transmission power parameter setting unit 4053 in setting the value of the parameter relevant to transmission power.

The number of information bits of ACK/NACK which is made where carrier aggregation is used may also be set based on the number of PDSCH CCs when the receiving operation of mobile station device 5 is done through the PDSCH CCs. The technology of controlling ON and OFF of the receiving operation for a downlink component carrier configured by base station device 3 is referred to as "CC activation/deactivation." Whether to set the component carrier to the activation state (receiving operation is ON state) or the deactivation state (receiving operation is OFF state) may be given explicitly by a dedicated command (Activation command) or implicitly under timer control.

An example of timer control will be described. When PDCCH is not detected on an activated component carrier within a predetermined period measured by a timer, it changes to a deactivated component carrier and the receiving operation is switched from ON to OFF. An activated component carrier is referred to as "Active CC" or "Activated CC". A deactivated component carrier is referred to as "Deactive CC" or "Deactivated CC." Namely, the number of information bits of ACK/NACK which is made where carrier aggregation is used may be set based on the number of Activated CCs.

SR for example indicates information about whether to request resource allocation. SR is of one bit. When management unit 4051 generates ACK/NACK which is made where carrier aggregation is used and SR, transmission power parameter setting unit 4053 sets the value of the parameter based on the signal configuration of the PUCCH in accordance with the number of information bits of ACK/NACK which is made where carrier aggregation is used and SR where the number of information bits of SR is one.

Even in the case where SR indicates not only the information about whether to request resource allocation but also other information items and is made up of multiple bits, the configuration described above can be applied. For example, SR may provide information indicating a request for allocation of an extremely large number of resources, information indicating a request for allocation of a large number of resources, information indicating a request for allocation of a small number of resources, information indicating failure to request for resource allocation, and may be made up of two bits. Namely, the amount of resources requested by mobile station device 5 to base station device 3 is indicated by SR.

When management unit 4051 generates ACK/NACK which is made where carrier aggregation is used and SR, transmission power parameter setting unit 4053 sets the value of the parameter based on the signal configuration of the PUCCH in accordance with the number of information bits of ACK/NACK which is made where carrier aggregation is used and SR, where number of information bits or SR is two. In the case of such an SR configuration, radio resource control unit 403 makes a comparison between the amount of data stored in the transmission buffer and multiple threshold values.

For example, when the amount of data stored in the transmission buffer is equal to or larger than the largest threshold value, radio resource control unit 403 outputs to management unit 4051 a control signal indicating that SR should be generated that requests allocation of an extremely large number of resources. When the amount of data stored in the transmission buffer is equal to or larger than the second largest threshold value and smaller than the largest threshold value, radio resource control unit 403 outputs to management unit 4051 a control signal indicating that SR should be generated that requests allocation of a large number of resources. When the amount of data stored in the transmission buffer is equal to or larger than the third largest threshold value and smaller than the second largest threshold value, radio resource control unit 403 outputs to management unit 4051 a control signal indicating that SR should be generated that requests allocation of a small number of resources. When the amount of data stored in the transmission buffer is smaller than the third largest threshold value, radio resource control unit 403 outputs to management unit 4051 a control signal indicating that SR should be generated that does not request resource allocation.

<M. Allocation of PUCCH Resource>

A description will be given of allocation of a resource of the first PUCCH for SR and allocation of a resource of the second PUCCH in communication system 1 according to an embodiment of the present invention.

Mobile station device 5 is informed in advance, by base station device 3, of a resource of periodic uplink subframes, as a resource for the first PUCCH for SR. The information indicating the resource for the first PUCCH for SR, including information indicating an uplink physical resource block, information indicating a code used for code multiplexing in the time domain, information indicating a code used for code multiplexing in the frequency domain, information indicating the period of the uplink subframe, and information indicating an uplink subframe where resource allocation is started, is conveyed from base station device 3 to mobile station device 5.

Mobile station device 5 is informed in advance, by base station device 3, of a resource of each uplink subframe, as a resource for the second PUCCH. As the information indicating a resource for the second PUCCH, information indicating an uplink physical resource block, information indicating a code used for code multiplexing in the time domain, and information indicating an uplink subframe where resource allocation is started, is conveyed from base station device 3 to mobile station device 5. The various information items may be conveyed by means of separate information fields or a common information field. For example, as the information indicating a resource for the second PUCCH, information indicating an uplink physical resource block and information indicating a code used for code multiplexing in the time domain is conveyed by means of a common information field, and information indicating an uplink subframe where resource allocation is started may be conveyed by means of an information field independent of the information field providing the information indicating an uplink physical resource block and the information indicating a code to be used for code multiplexing in the time domain.

Management unit 4051 generates SR at the timing corresponding to the uplink subframe where the resource for the first PUCCH for SR is allocated. The resource for the first PUCCH for SR is allocated in the periodic uplink subframe, and management unit 4051 periodically generates SR. Management unit 4051 generates ACK/NACK which is made where carrier aggregation is used, when communication using carrier aggregation is being performed and the mobile station device of the management unit detects at least one PDCCH addressed to the device.

Control unit 405 controls transmission processing unit 407 so that it transmits a signal using a resource for the second PUCCH when management unit 4051 generates at least ACK/NACK which is made where carrier aggregation is used. Control unit 405 controls transmission processing unit 407 so that it transmits a signal for the second PUCCH using a resource for the second PUCCH allocated in advance by base station device 3, when management unit 4051 generates ACK/NACK which is made where carrier aggregation is used and SR, or when management unit 4051 generates only ACK/NACK which is made where carrier aggregation is used.

Mobile station device 5 transmits, using the resource for the second PUCCH, a signal generated from information bits of ACK/NACK which is made where carrier aggregation is used and SR, through an uplink subframe to which a resource for the first PUCCH for SR and the resource for the second PUCCH are allocated. Mobile station device 5 transmits, using the resource for the second PUCCH, a signal generated from information bits of ACK/NACK which is made where carrier aggregation is used, through an uplink subframe to which the resource for the second PUCCH is allocated while the resource for the first PUCCH for SR is not allocated.

When management unit 4051 does not generate ACK/NACK which is made where carrier aggregation is used and management unit 4051 generates SR only, control unit 405 controls transmission processing unit 407 so that it transmits a signal using the resource for the first PUCCH for SR or controls transmission processing unit 407 so that it does not transmit a signal. When management unit 4051 generates SR indicating a request for resource allocation, control unit 405 controls transmission processing unit 407 so that it transmits a signal using the resource for the first PUCCH for SR. When management unit 4051 generates SR indicating that resource allocation is not requested, control unit 405 controls transmission processing unit 407 so that it does not transmit a signal.

Mobile station device 5 transmits a signal generated from information bits of SR indicating that resource allocation is requested, using the resource for the first PUCCH for SR, in an uplink subframe to which the resource for the first PUCCH for SR is allocated. In the case where resource allocation is not requested, mobile station device 5 transmits no signal.

Figure 8:
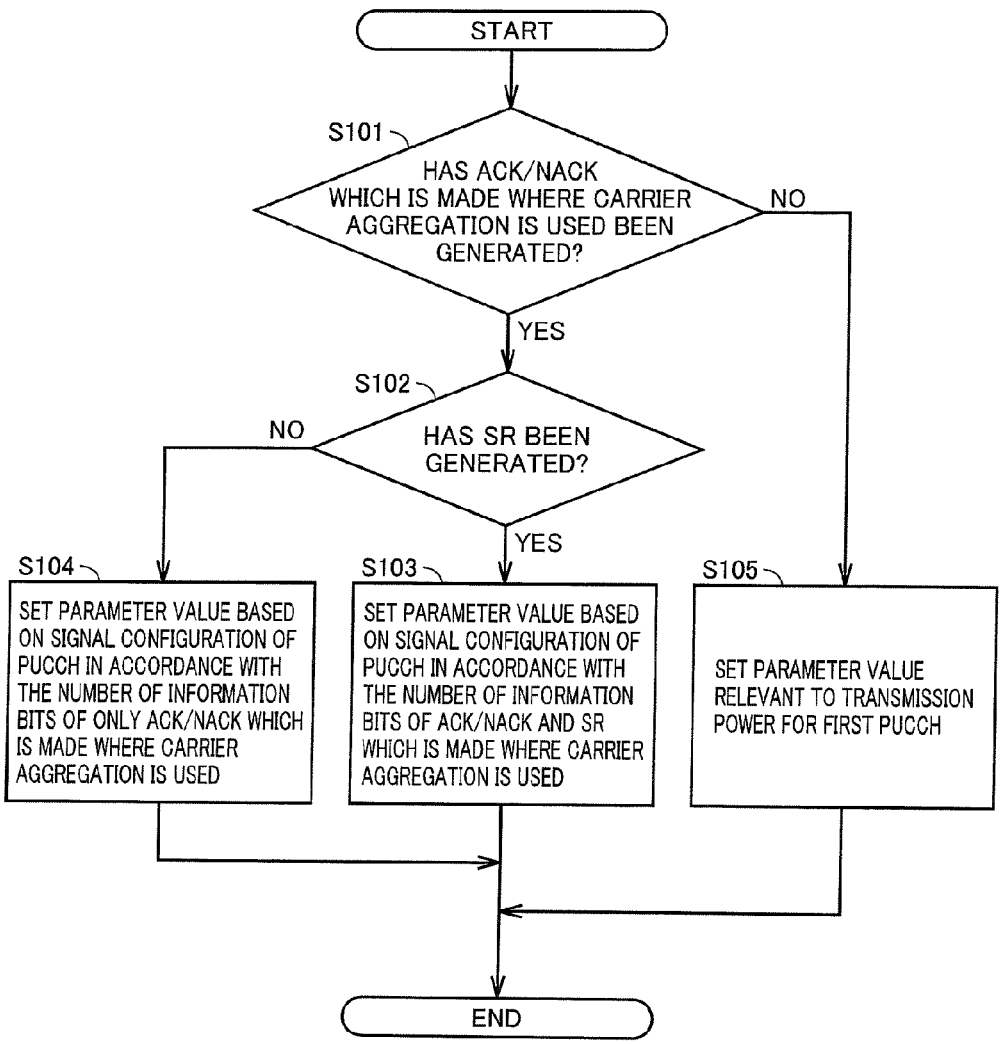
FIG. 8 is a flowchart showing an example process concerning setting of a value of a parameter relevant to transmission power of a mobile station device according to an embodiment of the present invention.

FIG. 8 is a flowchart showing an example process concerning setting of a value of a parameter relevant to transmission power of mobile station device 5 according to an embodiment of the present invention. For the sake of simplification of the description, the following description is chiefly given of setting of a value of the parameter based on the signal configuration of PUCCH for the second PUCCH. A detailed description about setting of a value of the parameter relevant to transmission power for the first PUCCH and setting of a value of the parameter different from the parameter based on the signal configuration of PUCCH for example will not be given as appropriate. In the following, a process in the case where management unit 4051 generates any one of different types of UCI will be described.

Control unit 405 of mobile station device 5 determines whether or not management unit 4051 has generated ACK/NACK which is made where carrier aggregation is used (step S101). When control unit 405 determines that management unit 4051 has generated ACK/NACK which is made where carrier aggregation is used (YES in step S101), control unit 405 determines whether or not management unit 4051 has generated SR (step S102).

When control unit 405 determines that management unit 4051 has generated SR (YES in step S102), transmission power parameter setting unit 4053 sets a value of the parameter based on the signal configuration of the PUCCH in accordance with the number of information bits of ACK/NACK which is made where carrier aggregation is used and SR (step S103). When control unit 405 determines that management unit 4051 has not generated SR (NO in step S102), transmission power parameter setting unit 4053 sets a value of the parameter based on the signal configuration of the PUCCH in accordance with the number of information bits of only ACK/NACK which is made where carrier aggregation is used (step S104).

In contrast, when control unit 405 determines that management unit 4051 has not generated ACK/NACK which is made where carrier aggregation is used (NO in step S101), transmission power parameter setting unit 4053 sets a value of the parameter relevant to transmission power for the first PUCCH (step S105).

After step S103 or step S104, mobile station device 5 uses the set parameter value to adjust, by transmission power adjustment unit 627, transmission power for the second PUCCH, and transmits a signal on the second PUCCH. After step S105, mobile station device 5 uses the set parameter value to adjust, by transmission power adjustment unit 627, transmission power for the first PUCCH, and transmits a signal on the first PUCCH.

<N. Summary>

As heretofore described, mobile station device 5 sets a value of the parameter relevant to transmission power, in accordance with the number of information bits of ACK/NACK and SR. Mobile station device 5 uses the set parameter value to control transmission power for the PUCCH which is used for transmitting a signal generated from the information bits of ACK/NACK and SR. Thus, base station device 3 can obtain, from the PUCCH it received, information of ACK/NACK and SR through appropriate reception characteristics.

More specifically, when ACK/NACK which is made where carrier aggregation is used and SR are generated, mobile station device 5 sets a value the parameter based on the signal configuration of the PUCCH, as a parameter relevant to transmission power for the second PUCCH, in accordance with the number of information bits of ACK/NACK which is made where carrier aggregation is used and SR. Mobile station device 5 uses the set parameter value to control transmission power for the second PUCCH, and transmits, on the second PUCCH, a signal generated from information bits of ACK/NACK which is made where carrier aggregation is used and SR. Thus, base station device 3 can obtain, from the second PUCCH it received, information of ACK/NACK which is made where carrier aggregation is used and SR through appropriate reception characteristics.

Furthermore, mobile station device 5 applies common coding to information bits of ACK/NACK which is made where carrier aggregation is used and SR to generate a signal. Mobile station device 5 transmits the generated signal on a single second PUCCH. Thus, coding (block coding), which is common to the case where a signal is generated from information bits of only ACK/NACK which is made where carrier aggregation is used, can be applied. Therefore, while the reception characteristics of receiving ACK/NACK which is made where carrier aggregation is used are appropriately maintained, increase in complexity of the device having multiple coding processes can be avoided. In addition, increase of PAPR (Peak-to-Average Power Ratio) where multiple PUCCHs are transmitted can be avoided.

Furthermore, when only ACK/NACK which is made where carrier aggregation is used is generated, mobile station device 5 sets a value of the parameter based on the signal configuration of the PUCCH, as a parameter relevant to transmission power for the second PUCCH, in accordance with the number of information bits of ACK/NACK. Mobile station device 5 uses the set parameter value to control transmission power for the second PUCCH, and transmits, on the second PUCCH, a signal generated from information bits of ACK/NACK which is made where carrier aggregation is used. Thus, as compared with the case where a signal generated from information bits of ACK/NACK which is made where carrier aggregation is used and SR, is transmitted on the second PUCCH, transmission power of a smaller value can be set for the second PUCCH. Therefore, while base station device 3 can obtain, from the second PUCCH, information of ACK/NACK which is made where carrier aggregation is used, through appropriate reception characteristics, and can also reduce interference with signals of other mobile station devices 5.

In the case where transmission power which is high beyond necessity is set for the second PUCCH, interference increases with a signal of the second PUCCH used by another mobile station device 5 for which a different code is used in code multiplexing in the time domain of the same uplink physical resource block. Mobile station device can avoid such an increase of the interference.

<O. Modification>

(1) Mobile station device 5 is not limited to mobile terminals. The present invention may also be implemented by providing a fixed terminal with the functions of mobile station device 5.

(2) The above-described configuration of mobile station device 5 may also be implemented by providing an integrated circuit with the functions and controlling the functions. In this case, the integrated circuit is an integrated circuit mounted on mobile station device 5 to cause mobile station device 5 to perform multiple functions, namely cause mobile station device 5 to perform a series of functions: (i) the function of managing generation of uplink control information; (ii) the function of setting a value of a parameter relevant to transmission power in accordance with the number of information bits of a receipt acknowledgement and a scheduling request in the case where the receipt acknowledgement which is uplink control information indicating positive acknowledgement or negative acknowledgement for downlink data as well as the scheduling request which is uplink control information indicating whether to request resource allocation are generated; (iii) the function of controlling, using the parameter having the set value, transmission power for the physical uplink control channel used for transmitting a signal generated from the information bits of the receipt acknowledgement and the scheduling request; and (iv) the function of transmitting the physical uplink control channel.

Mobile station device 5 for which such an integrated circuit is used sets a value of the parameter relevant to transmission power in accordance with the number of information bits of ACK/NACK and SR. This mobile station device 5 uses the set parameter value to control the transmission power for the PUCCH used for transmitting the signal generated from the information bits of ACK/NACK and SR, and transmits the PUCCH. Therefore, the base station device can use appropriate reception characteristics to obtain information of ACK/NACK and SR from the received PUCCH.

(3) The above-described operation may also be implemented by a program. A program running on mobile station device 5 and base station device 3 is a program controlling a CPU (Central Processing Unit) or the like (a program causing a computer to function) so that the above-described functions are implemented. Information handled by these devices is temporarily stored in a RAM when processed, thereafter stored in any of a variety of ROMs or HDD, and read, modified, and written by the CPU as required. The recording medium storing the program may be any of media such as semiconductor media (for example, ROM (Read Only Memory), nonvolatile memory cards, and the like), optical recording media (for example, DVD (Digital Versatile Disc), MO (Magneto-Optical disc), MD (MiniDisc), CD (Compact Disc), BD (Blu-ray Disc), and the like), and magnetic recording media (for example, magnetic tape, flexible disc, and the like). The loaded program may be executed to thereby implement the above-described functions. In addition, the functions of the present invention may also be implemented by processing in cooperation with the operating system or another application program, for example, based on instructions of the program. The recording medium is a medium which is not a temporary medium and has the program or the like that can be read by the computer.

For distribution in the market, the program may be stored on a portable recording medium to be distributed, or the program may be transferred to a server computer connected through a network such as the Internet. In this case, the storage device of the server computer is also encompassed by the scope of the present invention. Mobile station device 5 and base station device 3 in the embodiment described above may partially or wholly be implemented typically in the form of an LSI which is an integrated circuit. The functional blocks of mobile station device 5 and base station device 3 may individually be configured in the form of a chip, or may partially or wholly be integrated into a chip. The integrated circuit may be implemented not only in the form of an LSI but a dedicated circuit or general-purpose processor. If the advance in semiconductor technology provides any technology for implementing an integrated circuit that replaces the LSI, an integrated circuit provided by this technology may also be used.

Namely, the functions of mobile station device 5 may be implemented by an integrated circuit or implemented by a plurality of circuits. The functions of base station device 3 may also be implemented by an integrated circuit or implemented by a plurality of circuits.

<P. Additional Notes>

(1) The mobile station device transmits a signal to the base station device. The mobile station device includes (i) a management unit managing generation of uplink control information, (ii) a transmission power parameter setting unit setting a value of a parameter relevant to transmission power in accordance with the number of information bits of receipt acknowledgement and scheduling request, when the management unit generates the receipt acknowledgement which is uplink control information indicating positive or negative acknowledgement for downlink data, and the scheduling request which is uplink control information indicating whether to request resource allocation, and (iii) a transmission unit controlling, by means of the parameter with the value set by the transmission power parameter setting unit, the transmission power for a physical uplink control channel used for transmitting a signal generated from the information bits of the receipt acknowledgement and the scheduling request, and transmitting the physical uplink control channel.

(2) The transmission unit applies common coding to the information bits of the receipt acknowledgement and scheduling request to generate a signal, and transmits the generated signal on a single physical uplink control channel.

(3) In case that the management unit generates only the receipt acknowledgement, the transmission power parameter setting unit sets the value of the parameter relevant to transmission power in accordance with the number of the information bits of the receipt acknowledgement. The transmission unit controls the transmission power for the physical uplink control channel used for transmitting a signal generated from the information bits of the receipt acknowledgement, using the parameter with the value which is set by the transmission power parameter setting unit in accordance with the number of the information bits of the receipt acknowledgment.

(4) A communication system is constituted of a plurality of mobile station devices and a base station device communicating with the plurality of mobile station devices and transmits and receives signals generated from uplink control information. The base station device includes a reception unit receiving a signal transmitted from the mobile station device. The mobile station device includes (i) a management unit managing generation of uplink control information, (ii) a transmission power parameter setting unit setting a value of a parameter relevant to transmission power in accordance with the number of information bits of receipt acknowledgement and scheduling request, when the management unit generates the receipt acknowledgement which is uplink control information indicating positive or negative acknowledgement for downlink data, and the scheduling request which is uplink control information indicating whether to request resource allocation, and (iii) a transmission unit controlling, by means of the parameter with the value set by the transmission power parameter setting unit, the transmission power for a physical uplink control channel used for transmitting a signal generated from the information bits of the receipt acknowledgement and the scheduling request, and transmitting the physical uplink control channel to the base station device.

(5) A communication method is used for a mobile station device transmitting a signal to a base station device. The communication method includes at least the steps of (i) managing generation of uplink control information, (ii) setting a value of a parameter relevant to transmission power in accordance with the number of information bits of receipt acknowledgement and scheduling request, when the receipt acknowledgement which is uplink control information indicating positive or negative acknowledgement for downlink data, and the scheduling request which is uplink control information indicating whether to request resource allocation are generated, (iii) controlling, by means of the parameter with the set value, the transmission power for a physical uplink control channel used for transmitting a signal generated from the information bits of the receipt acknowledgement and the scheduling request, and (iv) transmitting the physical uplink control channel.

(6) An integrated circuit is mounted on a mobile station device to cause the mobile station device to perform a plurality of functions. The integrated circuit causes the mobile station device to perform a series of functions including (i) the function of managing generation of uplink control information, (ii) the function of setting a value of a parameter relevant to transmission power in accordance with the number of information bits of receipt acknowledgement and scheduling request, when the receipt acknowledgement which is uplink control information indicating positive or negative acknowledgement for downlink data, and the scheduling request which is uplink control information indicating whether to request resource allocation are generated, (iii) the function of controlling, by means of the parameter with the set value, the transmission power for a physical uplink control channel used for transmitting a signal generated from the information bits of the receipt acknowledgement and the scheduling request, and (iv) the function of transmitting the physical uplink control channel.

While the embodiment of the present invention has been described in detail with reference to the drawings, specific features are not limited to the embodiment and designs and the like that do not go beyond the substance of the present invention fall within the scope of the claims.

REFERENCE SIGNS LIST 3 base station device; 5, 5A, 5B, 5C mobile station device; 101 reception processing unit; 103 radio resource control unit; 105 control unit; 107 transmission processing unit; 109 reception antenna; 111 transmission antenna; 201 physical downlink shared channel processing unit; 203 physical downlink control channel processing unit; 205 downlink pilot channel processing unit; 207 multiplexing unit; 209 IFFT unit; 211 GI inserting unit; 213 D/A unit; 215 transmission RF unit; 219 turbo coding unit; 221 data modulation unit; 223 convolution coding unit; 225 QPSK modulation unit; 301 reception RF unit; 303 A/D unit; 305 component carrier separation unit; 307 uplink-component-carrier-basis reception processing unit; 309 symbol timing detection unit; 311 GI removal unit; 313 FFT unit; 315 subcarrier de-mapping unit; 317 propagation path estimation unit; 319 propagation path equalization unit (for PUSCH); 321 propagation path equalization unit (for PUCCH); 323 IDFT unit; 325 data demodulation unit; 327 turbo decoding unit; 329 physical uplink control channel detection unit; 401 reception processing unit; 403 radio resource control unit; 405 control unit; 407 transmission processing unit; 409 reception antenna; 411 transmission antenna; 501 reception RF unit; 503 A/D unit; 505 symbol timing detection unit; 507 GI removal unit; 509 FFT unit; 511 de-multiplexing unit; 513 propagation path estimation unit; 515 propagation path compensation unit (for PDSCH); 517 physical downlink shared channel decoding unit; 519 propagation path compensation unit (for PDCCH); 521 physical downlink control channel decoding unit; 523 data demodulation unit; 525 turbo decoding unit; 527 QPSK demodulation unit; 529 Viterbi decoder unit; 601 uplink-component-carrier-basis transmission processing unit; 603 component carrier synthesis unit; 605 D/A unit; 607 transmission RF unit; 611 turbo coding unit; 613 data modulation unit; 615 DFT unit; 617 uplink pilot channel processing unit; 619 physical uplink control channel processing unit; 621 subcarrier mapping unit; 623 IFFT unit; 625 GI inserting unit; 627 transmission power adjustment unit; 4051 management unit; 4053 transmission power parameter setting unit

The invention claimed is:

1. A mobile station device configured to and/or programmed to communicate with a base station device, said mobile station device comprising:
   a management unit configured to or programmed to generate, as uplink control information,
      a receipt acknowledgement indicating a positive acknowledgement or a negative acknowledgement for downlink data, and
      a scheduling request indicating whether to request said base station device to allocate a radio resource;
   a parameter setting unit configured to or programmed to set a value of a first parameter relevant to transmission power in accordance with a first amount of information of said receipt acknowledgement and said scheduling request and configured to or programmed to set a second parameter based on a transmission power control command; and
   a transmission unit configured to or programmed to control, by means of at least one of said first parameter and said second parameter, the transmission power for a first physical uplink control channel used for transmitting a first signal generated based on said receipt acknowledgement and said scheduling request, and configured to or programmed to transmit said first signal to said base station device using said first physical uplink control channel with said controlled transmission power in an uplink subframe in a case that resource of a physical uplink shared channel is not allocated, wherein
   a second amount of information of said scheduling request included in the first amount of information of said receipt acknowledgement and said scheduling request is one bit and said scheduling request is not transmitted using a second physical uplink control channel for said scheduling request in a case that said second physical uplink control channel for said scheduling request is configured in the uplink subframe and the management unit generates said receipt acknowledgement, and
   the second amount of information of said scheduling request included in the first amount of information of said receipt acknowledgement and said scheduling request is zero bit in a case that said second physical uplink control channel for said scheduling request is not configured in the uplink subframe.

2. The mobile station device according to claim 1, wherein a plurality of said physical uplink control channels are present, and said transmission unit is configured to or programmed to apply common coding to said receipt acknowledgement and said scheduling request to generate said first signal, and transmits said generated first signal on a single said physical uplink control channel.

3. The mobile station device according to claim 1, wherein in a case that said management unit is configured to or programmed to generate only said receipt acknowledgement, of said receipt acknowledgement and said scheduling request, said parameter setting unit is configured to or programmed to set said value of the first parameter in accordance with a third amount of information of said receipt acknowledgement, and said transmission unit is configured to or programmed to control the transmission power for the physical uplink control channel used for transmitting a second signal generated based on said receipt acknowledgement, using the first parameter with the value which is set by said parameter setting unit in accordance with the third amount of information of said receipt acknowledgement.

4. A communication method for use in a mobile station device which is configured to or programmed to communicate with a base station device, the communication method comprising:

generating, as uplink control information,
a receipt acknowledgement indicating a positive acknowledgement or a negative acknowledgement for downlink data, and
a scheduling request indicating whether to request said base station device to allocate a radio resource;

setting a value of a first parameter relevant to transmission power in accordance with a first amount of information of said receipt acknowledgement and said scheduling request;

setting a second parameter based on a transmission power control command;

controlling, by means of at least one of said first parameter and said second parameter, the transmission power for a first physical uplink control channel used for transmitting a signal generated based on said receipt acknowledgement and said scheduling request; and transmitting said first signal to said base station device using said first physical uplink control channel with said controlled transmission power in an uplink subframe in a case that resource of a physical uplink shared channel is not allocated, wherein a second amount of information of said scheduling request included in the first amount of information of said receipt acknowledgement and said scheduling request is one bit and said scheduling request is not transmitted using a second physical uplink control channel for said scheduling request in a case that said second physical uplink control channel for said scheduling request is configured in the uplink subframe and the management unit generates said receipt acknowledgement, and the second amount of information of said scheduling request included in first the amount of information of said receipt acknowledgement and said scheduling request is zero bit in a case that said second physical uplink control channel for said scheduling request is not configured in the uplink subframe.

5. A circuit device mountable on a mobile station device to cause said mobile station device to perform a plurality of functions, said circuit device comprising:

a first circuit configured to or programmed to generate, as uplink control information,
a receipt acknowledgement indicating a positive acknowledgement or a negative acknowledgement for downlink data, and
a scheduling request indicating whether to request said base station device to allocate a radio resource;

a second circuit configured to or programmed to set a value of a first parameter relevant to transmission power in accordance with a first amount of information of said receipt acknowledgement and said scheduling request and configured to and/or programmed to set a second parameter based on a transmission power control command;

a third circuit configured to or programmed to control, by means of at least one of said first parameter and said second parameter, the transmission power for a first physical uplink control channel used for transmitting a signal generated based on said receipt acknowledgement and said scheduling request; and a fourth circuit configured to or programmed to transmit said signal to said base station device using said first physical uplink control channel with said controlled transmission power in an uplink subframe in a case that resource of a physical uplink shared channel is not allocated, wherein a second amount of information of said scheduling request included in the first amount of information of said receipt acknowledgement and said scheduling request is one bit and said scheduling request is not transmitted using a second physical uplink control channel for said scheduling request in a case that said second physical uplink control channel for said scheduling request is configured in the uplink subframe and the management unit generates said receipt acknowledgement, and the second amount of information of said scheduling request included in the first amount of information of said receipt acknowledgement and said scheduling request is zero bit in a case that said second physical uplink control channel for said scheduling request is not configured in the uplink subframe.

6. The mobile station device according to claim 1, wherein said scheduling request is transmitted using said second physical uplink control channel for said scheduling request and is not transmitted using said first physical uplink control channel in a case that said scheduling request indicates to request to allocate a radio resource and the management unit does not generate said receipt acknowledgement, and said scheduling request is not transmitted in a case that said scheduling request indicates not to request to allocate a radio resource and the management unit does not generate said receipt acknowledgement.

* * * * *